US012683697B2

(12) United States Patent
Jacinto et al.

(10) Patent No.: US 12,683,697 B2
(45) Date of Patent: Jul. 14, 2026

(54) DOWNLINK SPEED ESTIMATION IN WIRELESS COMMUNICATION NETWORKS

(71) Applicant: T-MOBILE INNOVATIONS LLC, Overland Park, KS (US)

(72) Inventors: Marie Grace Jacinto, Bellevue, WA (US); Hermie Agustin Padua, Marysville, WA (US); Ariz Jacinto, Bellevue, WA (US); Anton Synytsia, Salem, OR (US); Otto Fonseca Escudero, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 352 days.

(21) Appl. No.: 18/298,858

(22) Filed: Apr. 11, 2023

(65) Prior Publication Data

US 2024/0348350 A1 Oct. 17, 2024

(51) Int. Cl.
| | |
|---|---|
| *H04B 17/318* | (2015.01) |
| *H04W 4/02* | (2018.01) |
| *H04W 24/08* | (2009.01) |
| *H04W 24/10* | (2009.01) |

(52) U.S. Cl.
CPC .......... *H04B 17/318* (2015.01); *H04W 4/025* (2013.01); *H04W 24/08* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 11,115,833 B1* | 9/2021 | Dennis | .................. | H04W 72/23 |
| 11,350,288 B1* | 5/2022 | Dennis | .................. | H04W 16/26 |
| 2009/0319236 A1* | 12/2009 | Blaunshtein | .......... | H04W 16/22 |
| | | | | 455/446 |
| 2016/0057765 A1* | 2/2016 | Jiang | ..................... | H04W 24/10 |
| | | | | 370/329 |
| 2016/0066202 A1* | 3/2016 | Dayanandan | ....... | H04W 72/563 |
| | | | | 370/252 |
| 2019/0380076 A1* | 12/2019 | Wang | ..................... | H04W 76/10 |
| 2022/0225146 A1* | 7/2022 | Yoo | ...................... | H04B 17/318 |

(Continued)

OTHER PUBLICATIONS

FCC guidelines—Establishing the digital opportunity data collection (Year: 2021), retrieved from https://docs.fcc.gov/public/attachments/fcc-21-20a1.pdf.*

*Primary Examiner* — Nishant Divecha

(57) ABSTRACT

Various embodiments comprise a wireless communication network configured to estimate wireless downlink speed. In some examples, the wireless communication network comprises data analysis circuitry. The data analysis circuitry receives a measurement report indicating received signal strength associated with a geographic location and a radio band. The data analysis circuitry converts the received signal strength for the radio band to a spectral efficiency for the radio band. The data analysis circuitry determines bandwidth for the radio band. The data analysis circuitry determines a spectral efficiency ratio for the radio band based on loading for the radio band and the geographic location. The data analysis circuitry estimates a downlink speed for the geographic location and the radio band based on the spectral efficiency ratio, the spectral efficiency, and the bandwidth.

20 Claims, 13 Drawing Sheets

(56)               References Cited

U.S. PATENT DOCUMENTS

2023/0064719 A1 *   3/2023   Wang ................... H04W 16/10
2023/0318685 A1 *  10/2023   Zhu ................... H04B 7/06956
                                                      370/329

* cited by examiner

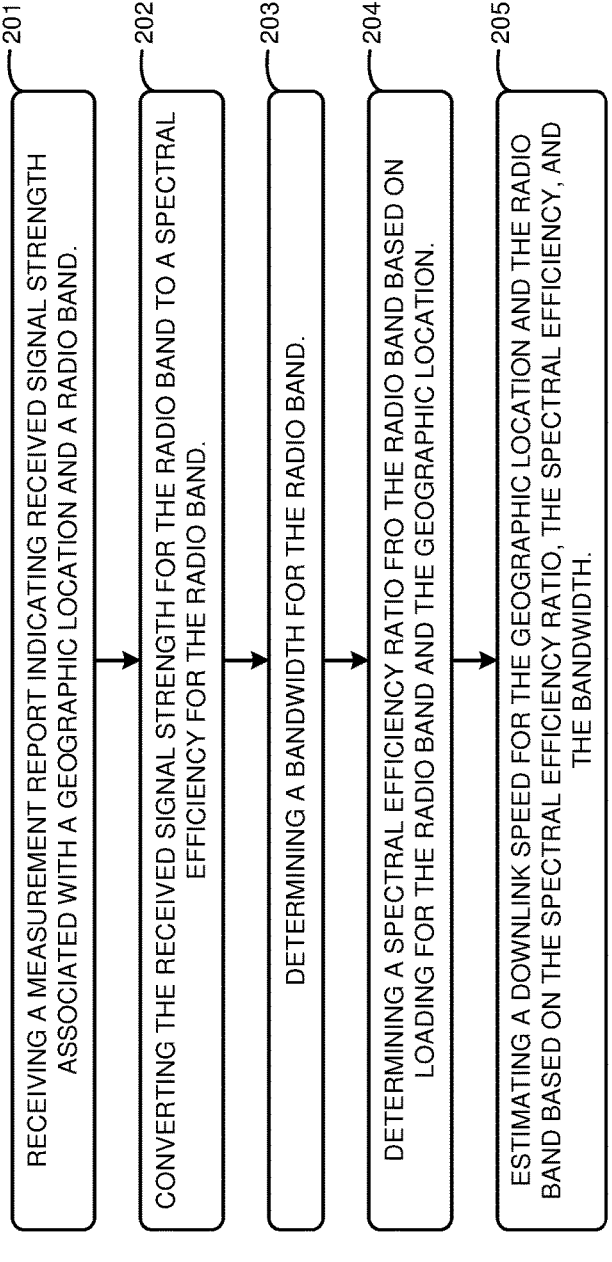

201 — RECEIVING A MEASUREMENT REPORT INDICATING RECEIVED SIGNAL STRENGTH ASSOCIATED WITH A GEOGRAPHIC LOCATION AND A RADIO BAND.

202 — CONVERTING THE RECEIVED SIGNAL STRENGTH FOR THE RADIO BAND TO A SPECTRAL EFFICIENCY FOR THE RADIO BAND.

203 — DETERMINING A BANDWIDTH FOR THE RADIO BAND.

204 — DETERMINING A SPECTRAL EFFICIENCY RATIO FRO THE RADIO BAND BASED ON LOADING FOR THE RADIO BAND AND THE GEOGRAPHIC LOCATION.

205 — ESTIMATING A DOWNLINK SPEED FOR THE GEOGRAPHIC LOCATION AND THE RADIO BAND BASED ON THE SPECTRAL EFFICIENCY RATIO, THE SPECTRAL EFFICIENCY, AND THE BANDWIDTH.

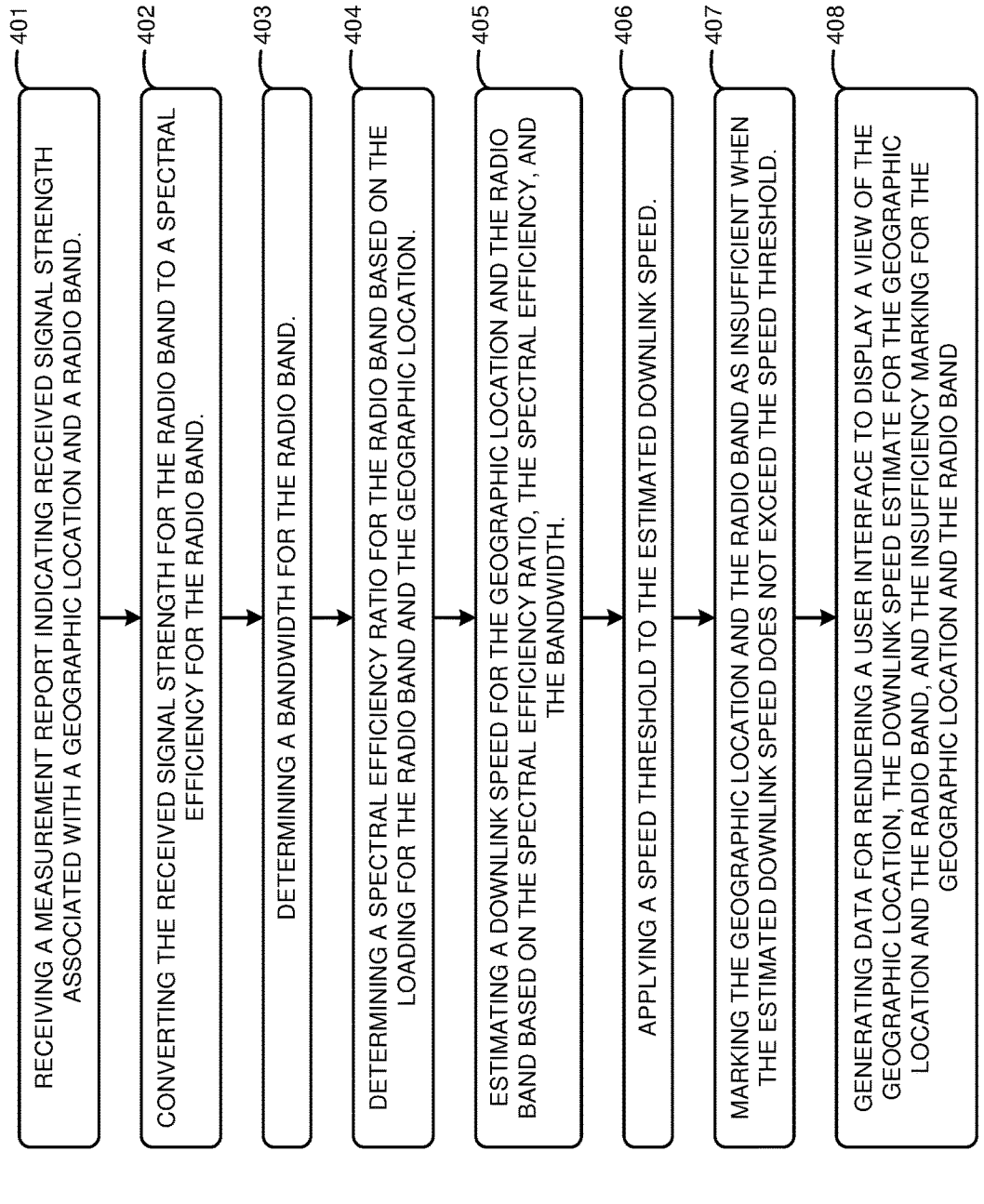

RECEIVING A MEASUREMENT REPORT INDICATING RECEIVED SIGNAL STRENGTH ASSOCIATED WITH A GEOGRAPHIC LOCATION AND A RADIO BAND.

401

CONVERTING THE RECEIVED SIGNAL STRENGTH FOR THE RADIO BAND TO A SPECTRAL EFFICIENCY FOR THE RADIO BAND.

402

DETERMINING A BANDWIDTH FOR THE RADIO BAND.

403

DETERMINING A SPECTRAL EFFICIENCY RATIO FOR THE RADIO BAND BASED ON THE LOADING FOR THE RADIO BAND AND THE GEOGRAPHIC LOCATION.

404

ESTIMATING A DOWNLINK SPEED FOR THE GEOGRAPHIC LOCATION AND THE RADIO BAND BASED ON THE SPECTRAL EFFICIENCY RATIO, THE SPECTRAL EFFICIENCY, AND THE BANDWIDTH.

405

APPLYING A SPEED THRESHOLD TO THE ESTIMATED DOWNLINK SPEED.

406

MARKING THE GEOGRAPHIC LOCATION AND THE RADIO BAND AS INSUFFICIENT WHEN THE ESTIMATED DOWNLINK SPEED DOES NOT EXCEED THE SPEED THRESHOLD.

407

GENERATING DATA FOR RENDERING A USER INTERFACE TO DISPLAY A VIEW OF THE GEOGRAPHIC LOCATION, THE DOWNLINK SPEED ESTIMATE FOR THE GEOGRAPHIC LOCATION AND THE RADIO BAND, AND THE INSUFFICIENCY MARKING FOR THE GEOGRAPHIC LOCATION AND THE RADIO BAND

DOWNLINK SPEED ESTIMATION IN WIRELESS COMMUNICATION NETWORKS

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

The quality of the wireless data service depends in part on the downlink data rate. Downlink data rates characterize the amount of information that can be wirelessly transmitted to a wireless user device over a given period of time. Downlink data rates are often measured in Megabits-per-second (Mbps). As downlink data rates increase, the quality of the wireless data services increases. Likewise, as the downlink data rates decrease, the quality of the wireless data services decreases. Downlink data rates are affected by a variety of factors including the user device's received downlink signal strength, user device type, the bandwidth of the radio band, RAN congestion, the number of available RANs, and the like. Federal government mandates require wireless communication networks to provide downlink data rates that exceed a threshold value for a target percentage of the population. However, given the size and complexity of wireless communication networks, it is difficult for network operators to identify regions of the network that do not meet the federal government mandates. Conventional downlink data rate testing involves drive-testing network speeds using a vehicle which is both inefficient and costly.

Unfortunately, wireless communication networks do not efficiently estimate downlink data rates for wireless user devices. Moreover, the wireless communication networks do not effectively identify geographic regions and radio bands that fail to provide adequate downlink data rates.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for identifying geographic regions of sufficient and insufficient downlink wireless coverage in a wireless communication network. Some embodiments comprise a method of operating a wireless communication network to estimate wireless downlink speed. The method comprises receiving a measurement report indicating received signal strength associated with a geographic location and a radio band. The method further comprises converting the received signal strength for the radio band to a spectral efficiency for the radio band. The method further comprises determining a bandwidth for the radio band. The method further comprises determining a spectral efficiency ratio for the radio band based on loading for the radio band and the geographic location. The method further comprises estimating a downlink speed for the geographic location and the radio band based on the spectral efficiency ratio, the spectral efficiency, and the bandwidth.

Some embodiments comprise a wireless communication network configured to estimate wireless downlink speed. The wireless communication network comprises data analysis circuitry. The data analysis circuitry receives a measurement report indicating received signal strength associated with a geographic location and a radio band. The data analysis circuitry converts the received signal strength for the radio band to a spectral efficiency for the radio band. The data analysis circuitry determines bandwidth for the radio band. The data analysis circuitry determines a spectral efficiency ratio for the radio band based on loading for the radio band and the geographic location. The data analysis circuitry estimates a downlink speed for the geographic location and the radio band based on the spectral efficiency ratio, the spectral efficiency, and the bandwidth.

Some embodiments comprise a method of operating a wireless communication network to estimate wireless downlink speed. The method comprises receiving a measurement report indicating received signal strength associated with a geographic location and a radio band. The method further comprises converting the received signal strength for the radio band to a spectral efficiency for the radio band. The method further comprises determining a bandwidth for the radio band. The method further comprises determining a spectral efficiency ratio for the radio band based on loading for the radio band and the geographic location. The method further comprises estimating a downlink speed for the geographic location and the radio band based on the spectral efficiency ratio, the spectral efficiency, and the bandwidth. The method further comprises applying a speed threshold to the estimated downlink speed. The method further comprises marking the geographic location and the radio band as insufficient when the estimated downlink speed does not exceed the speed threshold. The method further comprises generating data for rendering a user interface to display a view of the geographic location, the downlink speed estimate for the geographic location and the radio band, and the insufficiency marking for the geographic location and the radio band.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the wireless communication network to estimate wireless downlink speed.

FIG. 4 illustrates an exemplary operation of the wireless communication network to estimate wireless downlink speed.

Figure 1:
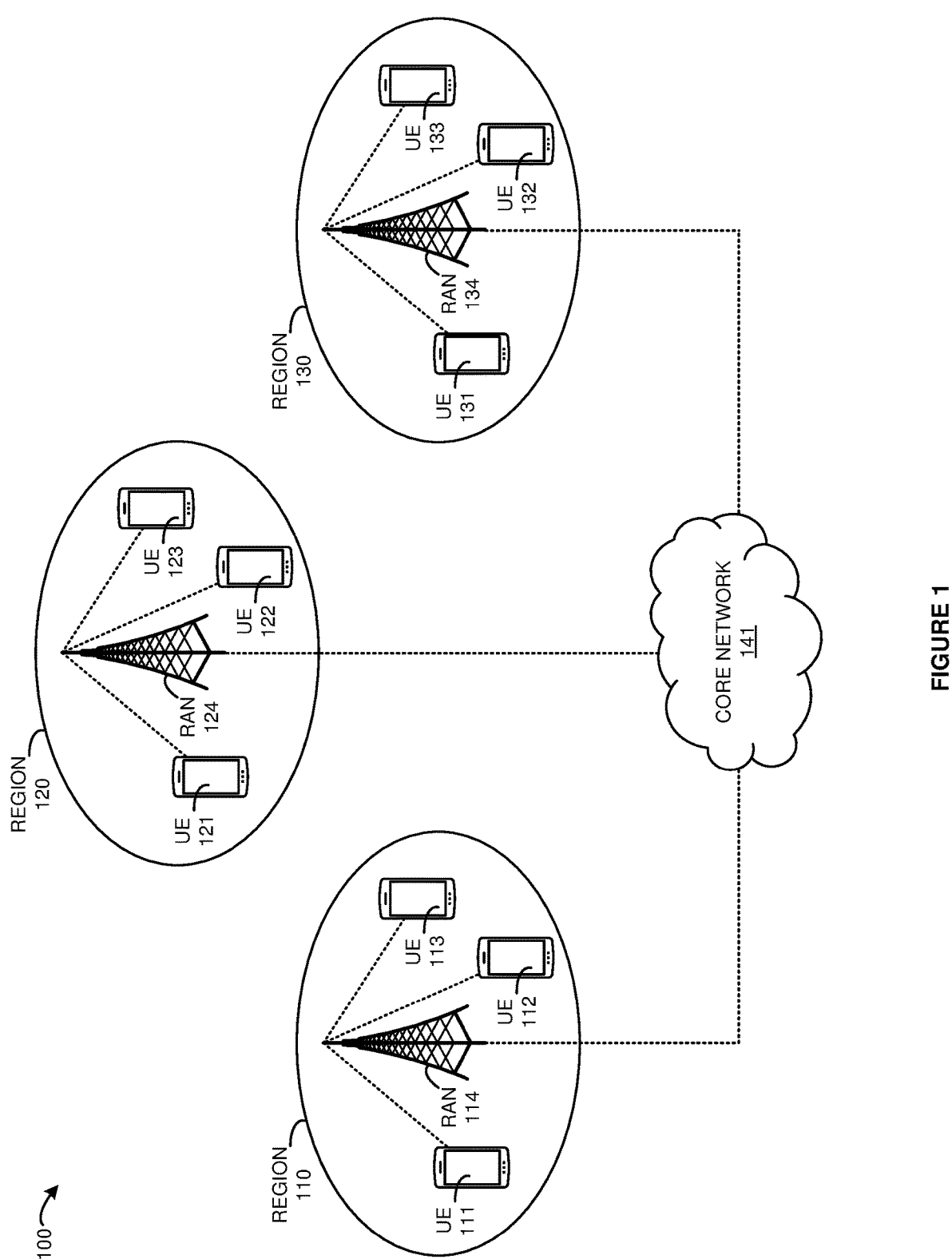
FIG. 1 illustrates a wireless communication network to estimate wireless downlink speed.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to estimate wireless downlink speed. Wireless communication network 100 delivers services like machine communications, internet-access, media-streaming, or some other wireless communications product. Wireless communication network 100 comprises region 110, region 120, region 130, and core network 141. Region 110 comprises User Equipment (UEs) 111-113 and Radio Access Network (RAN) 114. Region 120 comprises UEs 121-123 and RAN 124. Region 130 comprises UEs 131-133 and RAN 134. Regions 110, 120, and 130 are representative of different geographic regions that wireless communication network 100 provides wireless data services to over RANs 114, 124, and 134. In other examples, wireless communication network 100 may comprise additional or different elements than those illustrated in FIG. 1.

Various examples of network operation and configuration are described herein. In some examples, core network 141 receives measurement reports from RAN 114, 124, and 134. The measurement reports indicate received signal strength for UEs 111-113, UEs 121-123, and UEs 131-133 in association with their corresponding regions and radio bands. For example, one of the measurement reports may indicate the received signal strength of UE 111, that UE 111 resides in region 110, and that UE 111 used a 5GNR radio band. Core network 141 converts the received signal strengths for the radio bands to spectral efficiencies for the radio bands. Spectral efficiency is a measure of the information rate that can be transmitted over a given bandwidth. Core network 141 determines bandwidths for the radio bands indicated in the measurement reports. Core network 141 determines loading for each of RANs 114, 124, and 134 and determines spectral efficiency ratios for the reported bands based on the loading of RANs 114, 124, and 134. For example, core network 141 may determine the spectral efficiency ratio for the band used by UE 122 based on the loading of RAN 124. Core network 141 estimates downlink signal speeds for regions 110, 120, and 130 based on the spectral efficiency ratios, the spectral efficiencies, and the bandwidths.

Wireless communication network 100 provides wireless data services to UEs 111-113, UEs 121-123, and UEs 131-133. Exemplary UEs include phones, computers, vehicles, robots, and sensors. RANs 114, 124, and 134 exchange wireless signals with respective ones of UEs 111-113, UEs 121-123, and UEs 131-133 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). RANs 114, 124, and 134 are connected to core network 141 over backhaul data links. RANs 114, 124, and 134 exchange network signaling and user data with network elements in core network 141. RANs 114, 124, and 134 and core network 141 may communicate via edge networks like internet backbone providers, edge computing systems, or another type of edge system to provide the backhaul data links between RANs 114, 124, and 134 and core network 141.

RANs 114, 124, and 134 may comprise Radio Units (RUS), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 141. The CUs handle higher wireless network layers like the Radio Resource Control (RRC), Service Data Adaption Protocol (SDAP), and Packet Data Convergence Protocol (PDCP). The CUs are coupled to network functions core network 141. Core network 141 executes the network functions to provide wireless data services to UEs 111-113, UEs 121-123, and UEs 131-133 over the RANs 114, 124, and 134. Exemplary network functions include Access and Mobility Management Function (AMF), Session Management Function (SMF), User Plane Function (UPF), Network Data Analytics Function (NWDAF), Analytics Data Repository Function (ADRF), Data Collection Coordination Function (DCCF), and Messaging Framework Adaptor Function (MFAF). Network core 141 may comprise user interface systems for network operators to view the downlink speed estimates for regions 110, 120, and 130.

FIG. 2 illustrates process 200. Process 200 comprises an exemplary operation of wireless communication network 100 to estimate wireless downlink speed. The operation may vary in other examples. The operations of process 200 comprise receiving a measurement report indicating received signal strength associated with a geographic location and a radio band (step 201). The operations further comprise converting the received signal strength for the radio band to a spectral efficiency for the radio band (step 202). The operations further comprise determining a bandwidth for the radio band (step 203). The operations further comprise determining a spectral efficiency ratio for the radio band based on loading for the radio band and the geographic location (step 204) The operations further comprise estimating a downlink speed for the geographic location and the radio band based on the spectral efficiency ratio, the spectral efficiency, and the bandwidth (step 205).

Figure 3:
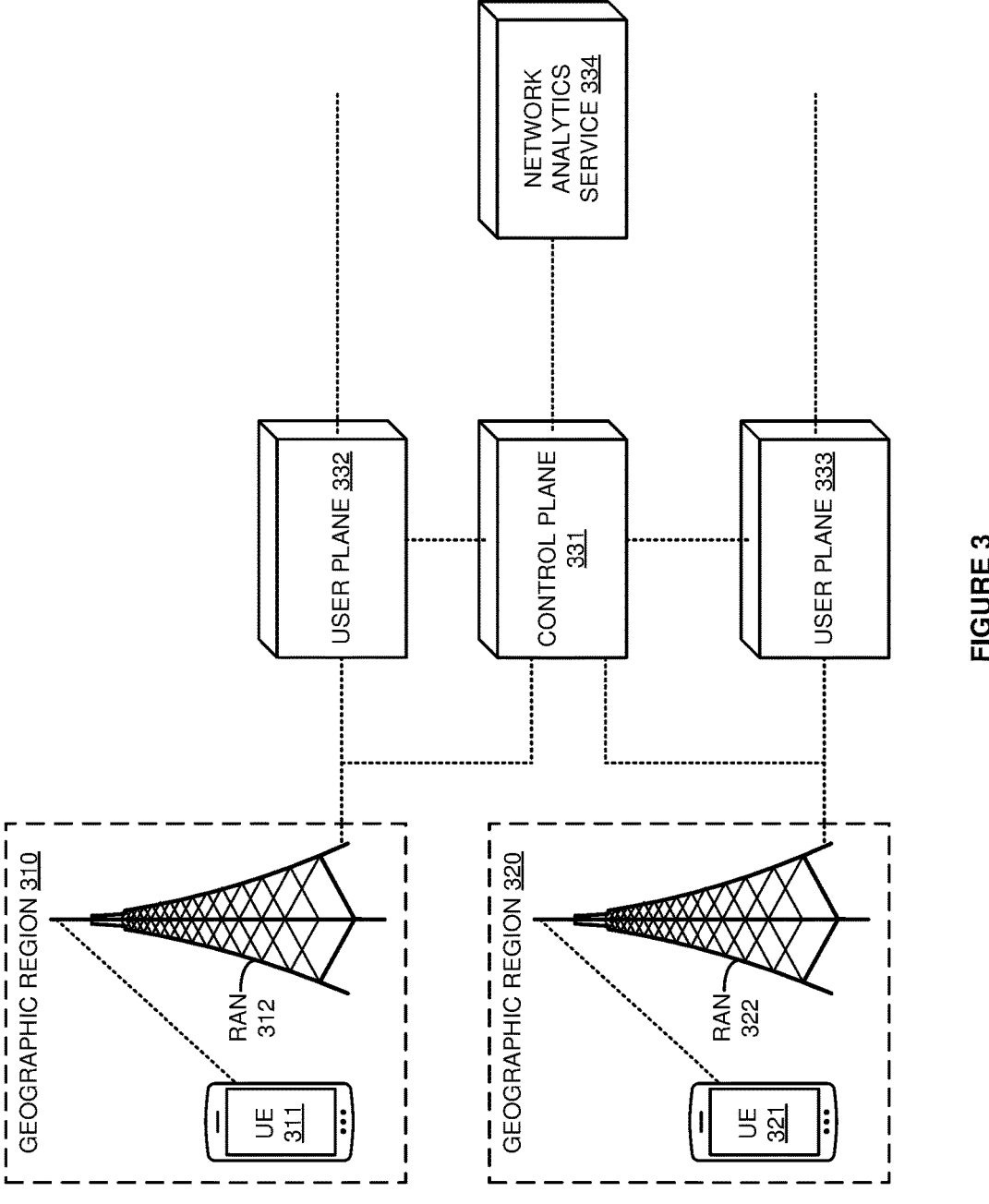
FIG. 3 illustrates a wireless communication network to estimate wireless downlink speed.

FIG. 3 illustrates wireless communication network 300 network to estimate wireless downlink speed. Wireless communication network 300 is an example of communication network 100, however network 100 may differ. Wireless communication network 300 comprises geographic regions 310 and 320, control plane 331, user planes 332-333, and network analytics service 334. Geographic regions 310 and 320 are representative of distinct geographic areas. For example, geographic region 310 may comprise a first locality while geographic region 320 may comprise a second locality. Geographic region 310 comprises UE 311 and RAN 312. Geographic region 320 comprises UE 321 and RAN 322. In other examples, wireless communication network 300 may comprise additional or different elements than those illustrated in FIG. 3.

In some examples, network analytics service 334 receives a measurement report associated with UE 311. The measurement report indicates UE 311's received signal strength, UE 311's presence in geographic region 310, and the radio band (or bands) used by UE 311. The received signal strength may comprise a Received Signal Received Power (RSRP) measurement. Network analytics service 334 converts the received signal strength for the radio band indicated in the measurement report for UE 311 to a spectral efficiency for the radio band. For example, network analytics service 334 may maintain a data structure that correlates radio bands to spectral efficiencies. Network analytics service 334 determines a bandwidth for the radio band. For example, network analytics service 334 may identify the frequency range of the band used by UE 311. Network analytics service 334 identifies loading for RAN 312 and calculates a spectral efficiency ratio for the radio band based on the loading of RAN 312 and the geographic location of region 310. Network analytics service 334 estimates the downlink speed for the radio band used by UE 311 in region 310 based on the spectral efficiency ratio, the spectral efficiency, and the bandwidth. For example, network analytics service 334 may execute a downlink speed estimation algorithm that takes spectral efficiency ratio, the spectral efficiency, and the bandwidth as inputs and produces a downlink speed estimate as an output. Network analytics service applies a speed threshold to the estimated downlink speed for UE 311. The speed threshold may comprise a target data rate in Megabits-per-second (Mbps). When the estimated downlink speed does not exceed the speed threshold, network analytics service 334 marks geographic region 310 and the radio band as insufficient. Network analytics service 334 generates data for rendering a user interface to display a view of region 310, the corresponding downlink speed estimate for region 310 and the radio band, and the insufficiency marking for region 310 and the band. A network operator may view the display using a user interface system resident in, or associated with, analytics service 334.

Network analytics service 334 receives an additional measurement report associated with UE 321. The measurement report indicates UE 321's received signal strength, UE 321's presence in geographic region 320, and the radio band (or bands) used by UE 321. Network analytics service 334 converts the received signal strength for the radio band used by UE 311 to a spectral efficiency for the radio band and determines a bandwidth for the radio band. Network analytics service 334 identifies loading for RAN 322 and calculates a spectral efficiency ratio for the radio band based on the loading. Network analytics service 334 estimates the downlink speed for the radio band used by UE 321 in region 320 based on the spectral efficiency ratio, the spectral efficiency, and the bandwidth. Network analytics service 334 applies a speed threshold to the estimated downlink speed for UE 321. When the estimated downlink speed meets or exceeds the speed threshold, network analytics service 334 marks geographic region 320 and the radio band as sufficient. Network analytics service 334 generates data for rendering a user interface to display a view of region 320, the corresponding downlink speed estimate for region 320 and the radio band, and the sufficiency marking for region 320 and the band.

Advantageously, wireless communication network 300 efficiently estimates downlink data rates for UEs 311 and 321. Moreover, wireless communication network 300 effectively identifies geographic regions and radio bands that do not exceed downlink data rate thresholds based on the downlink speed estimates. By identifying deficient regions and bands, network operators can plan out where to build out additional network infrastructure to increase downlink speeds. Furthermore, network operators can minimize or avoid drive testing geographic regions that have sufficient downlink speeds.

UE 311, RAN 312, UE 321, and RAN 322 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RANs 312 and 322, control plane 331, user planes 332 and 333, and network analytics service 334 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UEs 311 and 321 comprise phones, vehicles, computers, sensors, drones, robots, or other types of data appliances with wireless and/or wireline communication circuitry. Although RANs 312 and 322 are illustrated as towers, RANs 312 and 322 may comprise other types of mounting structures (e.g., buildings), or no mounting structure at all. RANs 312 and 322 comprise Fifth Generation (5G) RANs, LTE RANs, gNodeBs, eNodeBs, NB-IoT access nodes, LP-WAN base stations, wireless relays, WIFI hotspots, Bluetooth access nodes, and/or another wireless or wireline network transceiver. UE 311, RAN 312, UE 321, and RAN 322 comprise antennas, amplifiers, filters, modulation, analog/digital interfaces, microprocessors, software, memories, transceivers, bus circuitry, and the like. Control plane 331 comprises network functions like AMF, SMF, and the like. User planes 332 and 333 comprise network functions like UPF, edge UPF, and the like. Network analytics service 334 comprises network functions like NWDAF, MFAF, DCCF, and ADRF. UEs 311 and 321, RANs 312 and 322, control plane 331, user planes 332 and 333, and network analytics service 334 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, and network functions. The microprocessors retrieve the software from the memories and execute the software to drive the operation of wireless communication network 300 as described herein.

FIG. 4 illustrates process 400. Process 400 comprises an exemplary operation of wireless communication network 300 to estimate wireless downlink speed. The operation may vary in other examples. The operations of process 400 comprise receiving a measurement report indicating received signal strength associated with a geographic location and a radio band (step 401). The operations further comprise converting the received signal strength for the radio band to a spectral efficiency for the radio band (step 402). The operations further comprise determining a bandwidth for the radio band (step 403). The operations further comprise determining a spectral efficiency ratio for the radio band based on the loading for the radio band and the geographic location (step 404). The operations further comprise estimating a downlink speed for the geographic location and the radio band based on the spectral efficiency ratio, the spectral efficiency, and the bandwidth (step 405). The operations further comprise applying a speed threshold to the estimated downlink speed (step 406). The operations further comprise marking the geographic location and the radio band as insufficient when the estimated downlink speed does not exceed the speed threshold (step 407). The operations further comprise generating data for rendering a user interface to display a view of the geographic location, the downlink speed estimate for the geographic location and the radio band, and the insufficiency marking for the geographic location and the radio band (step 408).

Figure 5:
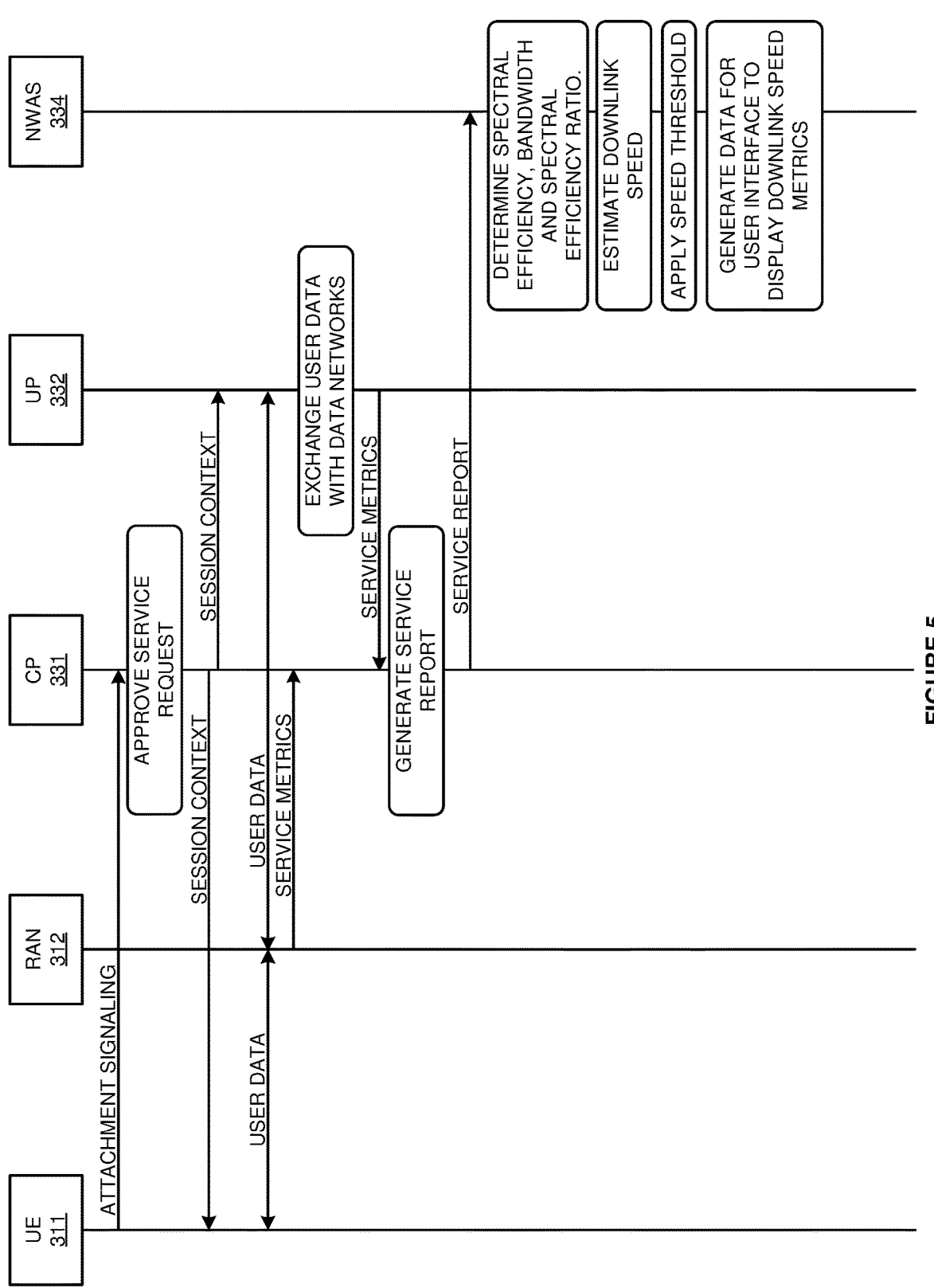
FIG. 5 illustrates an exemplary operation of the wireless communication network to estimate wireless downlink speed.

FIG. 5 illustrates an exemplary operation of wireless communication network 300 to estimate wireless downlink speed. The operation may vary in other examples. In operation, UE 311 transfers attachment signaling to control plane (CP) 331 over RAN 312. The attachment signaling comprises a request for wireless data service and includes a received signal strength measurement for RAN 312 and a location of UE 311. Control plane 331 receives the attachment signaling and approves the service request for UE 311. Control plane 331 detects the received signal strength measurement and UE location in the attachment request and caches the information as service metrics.

Control plane 331 instructs user plane 332 to establish the requested data session with UE 311. Control place 331 transfers session context to UE 311 via RAN 312 and to user plane 332. The session context typically comprises services values like QoS and network addresses for use by UE 311 and user plane 332 to setup the session. UE 311 exchanges user data for the session with RAN 312. RAN 312 exchanges the user data with user plane 332. RAN 312 reports service metrics that characterize the wireless service delivery to control plane 331. User plane 332 exchanges the user data with external data networks. User plane 332 reports additional service metrics that characterize the wireless service delivery to control plane 331. The reported service metrics comprise data like max/min bit rate, average bit rate, radio band, RAN loading, and/or other metrics that characterize the wireless communication service received by UE 311. Control plane 331 generates a service report based on the received and cached metrics and transfers the service report to network analytics service (NWAS) 334. For example, the service report may comprise information like received signal strength for RAN 312, geographic location of UE 311, session average bit rate, radio bands, RAN loading, and the like.

Network analytics service 334 receives the service report from control plane 331. Network analytics service 334 correlates the reported geographic location of UE 311 to geographic region 310. Network analytics service 334 identifies the bandwidth for the radio band indicated by the service report. Network analytics service 334 determines a spectral efficiency for the radio band based on the measured received signal strength of RAN 312. For example, network analytics service 334 may maintain a data structure that correlates signal strengths on radio bands to spectral efficiencies. Network analytics service 334 derives a spectral efficiency ratio for the band based on the serving sector loading of RAN 312 indicated in the service report. Network analytics service 334 estimates a downlink data speed for UE 311 based on the bandwidth, spectral efficiency, and spectral efficiency ratio. In some examples, analytics service 334 utilizes additional metrics like device type and UE location to determine estimate the downlink speed. Network analytics service 334 associates the estimated speed for the band with geographic region 310.

Network analytics service 334 applies a downlink speed threshold to the estimated downlink speed to determine if the downlink speed for the band in region 310 is sufficient. The speed threshold may comprise a target downlink data rate. For example, network analytics service 334 may estimate downlink speeds for other UEs present in region 310. Network analytics service 334 may apply the threshold to the estimated downlinks speed for UE 311 and the other UEs in region 310. When the proportion of UEs in region 310 comprise downlink speeds for the band below the threshold, analytics circuitry 334 may mark region 310 as insufficient. Likewise, when the proportion of UEs in region 310 comprise downlink speeds for the band above the threshold, analytics circuitry 334 may mark region 310 as sufficient.

Network analytics service 334 generates data for rendering a user interface to display the downlink speed metrics for region 310 and the radio band. The display may comprise a map depicting region 310 as well as downlink speed metrics for the radio band within region 310. For example, the display may illustrate the geographic location of region 310, the number of users within region 310, and the proportion of users that receive downlink speeds that exceed the threshold. User interface systems associated with network analytics service 334 utilize the data to render the user interface for viewing by network operators.

Figure 6:
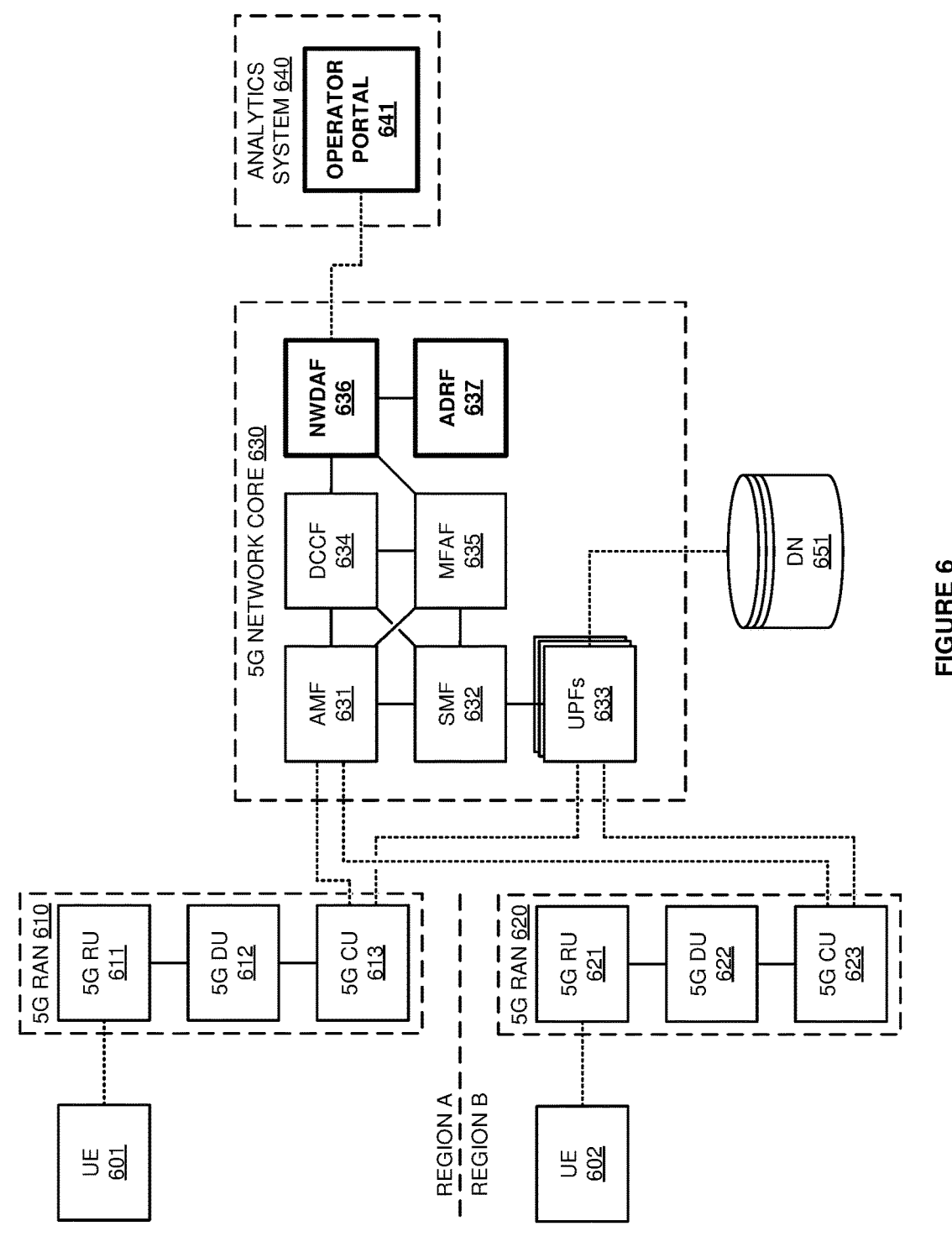
FIG. 6 illustrates a Fifth Generation (5G) communication network to estimate wireless downlink speed.

FIG. 6 illustrates 5G communication network 600 to estimate wireless downlink speed. 5G communication network 600 comprises an example of wireless communication networks 100 and 300, although networks 100 and 300 may differ. 5G communication network 600 comprises UEs 601- 602, 5G RAN 610, 5G RAN 620, 5G network core 630, analytics system 640, and data network (DN) 651. 5G RAN 610 comprises 5G RU 611, 5G DU 612, and 5G CU 613. 5G RAN 620 comprises 5G RU 621, 5G DU 622, and 5G CU 623. Network core 630 comprises AMF 631, SMF 632, UPFs 633, DCCF 334, MFAF 635, NWDAF 636, and ADRF 637. Analytics system 640 comprises operator portal 641. Other network functions and network elements like Authentication Server Function (AUSF), Network Slice Selection Function (NSSF), and Unified Data Management (UDM) are typically present in and 5G network core 630 but are omitted for clarity. As illustrated in FIG. 6, a portion of 5G communication network 600 resides in region A while another portion of network 600 resides in region B. In this example, UE 601 and 5G RAN 610 reside in region A while UE 602 and 5G RAN 620 reside in region B. Regions A and B are representative of distinct geographic regions. Although network 600 is depicted comprising two geographic regions, network 600 typically comprises many more geographic regions than illustrated in FIG. 6.

In region A. UE 601 wirelessly attaches to CU 613 via DU 612 and RU 611. UE 601 exchanges attachment signaling with CU 613 to establish a Radio Resource Control (RRC) connection with 5G network applications hosted by CU 613. The attachment signaling indicates information like a registration type, UE capabilities, requested slice types, PDU session requests, RSRP, and UE location. CU 613 transfers a registration request for UE 601 to AMF 631. The registration request comprises information transferred by UE 601 in the attachment signaling. AMF 631 transfers an identify request to UE 601 via RAN 610. UE 601 responsively indicates its identity to AMF 631 via RAN 610. AMF 631 interacts with other network functions like NSSF, AUSF, and UDM to authenticate and authorize UE 601 for wireless data services.

Responsive to the authentication and authorization, AMF 631 retrieves UE context for UE 601 to establish the Protocol Data Unit (PDU) session. The UE context comprises Quality-of-Service (QOS) metrics, slice identifiers, network addresses, and the like. AMF 631 selects SMF 632 to establish the PDU session for UE 601 based on the UE context. SMF 632 selects one of UPFs 633 to establish the PDU session for UE 601. SMF 632 transfers session context for the PDU session to AMF 631. AMF 631 transfers the session context to UE 601 over RAN 610. UE 601 begins the PDU session based on the session context. UE 601 wirelessly exchanges user data with CU 613 over RU 611 and DU 612. CU 613 exchanges the user data with the selected one of UPFs 633. The selected one of UPFs 633 exchanges the user data with data network 651.

CU 613, AMF 631, SMF 632, and UPFs 633 generate service metrics that characterize the PDU session for UE 601. The service metrics may include radio band, sector loading, average bit rate, reported RSRP, PDU session type, received QoS, UE location, and the like. CU 613 reports its service metrics to AMF 631. The serving one of UPFs 633 reports its service metrics to SMF 632. NWDAF 636 is subscribed to AMF 631 and SMF 632 to receive service reports characterizing wireless data services provided to UEs. AMF 631 and SMF 632 generate service reports that include the service metrics. AMF 631 and SMF 632 interface with DCCF 634 and MFAF 635 to transfer service reports for delivery to NWDAF 636. DCCF 634 processes the service reports from AMF 631 and SMF 632 to format the service reports for ingestion by NWDAF 636.

NWDAF 636 extracts service metrics characterizing the wireless service delivery to UE 601 from the service reports. NWDAF 636 correlates the geographic location of UE 601 to region A. For example, the UE location indicated by UE 601 may comprise Global Positioning System (GPS) coordinates for UE 601. NWDAF 636 may determine the GPS coordinates for UE 601 fall within a coordinate range that defines the boundaries of region A. Once UE 601 has been associated with region A. NWDAF 636 calculates spectral efficiency for the radio band used by UE 601 based on the RSRP measured by UE 601. Typically, as RSRP increases, spectral efficiency also increases. In this example, the RSRP comprises a measured RSRP received from UE 601. For example, UE 601 may measure signal strength of a pilot signal transmitted by RAN 610 to measure the RSRP. However, in other examples, NWDAF 636 may estimate RSRP based on the service metrics received from AMF 631 and SMF 632. For example, NWDAF 636 may estimate RSRP based on the radio band, UE antenna type, RAN antenna type, UE proximity to RAN, and/or other factors that affect RSRP.

NWDAF 636 calculates a spectral efficiency ratio for the radio band based on the serving sector loading of RAN 610. NWDAF 636 determines the bandwidth for the radio band used by UE 601. NWDAF 636 executes an algorithm that takes bandwidth, spectral efficiency, and spectral efficiency ratio as inputs and outputs a downlink speed estimation for UE 601 in Mbps. NWDAF 636 compares the speed estimation for UE 601 to a downlink speed threshold to determine if the estimated speed exceeded, or fell below, the Mbps threshold. When the speed estimate falls below the speed threshold, NWDAF 636 marks the downlink speed for UE 601 as insufficient. When the speed estimate exceeds the speed threshold, NWDAF 636 marks the downlink speed for UE 601 as sufficient. NWDAF 636 accesses ADRF 637 to retrieve a downlink speed profile for the radio band used by UE 601 and region A. The downlink speed profile indicates the percentage of population within region A that received downlink speeds that met or exceeded the downlink speed threshold on the radio band. NWDAF 636 updates the profile with the sufficiency or insufficiency speed marking for UE 601. NWDAF 636 stores the updated speed profile in ADRF 637.

In region B. UE 602 wirelessly attaches to CU 623 via DU 622 and RU 621. UE 602 exchanges attachment signaling with CU 623 to establish an RRC connection. The attachment signaling indicates registration type, UE capabilities, requested slice types, PDU session requests, measured RSRP, and UE location. CU 623 forwards a registration request for UE 602 to AMF 631. The registration request comprises the information sent by UE 602 in the attachment signaling. AMF 631 transfers an identity request to UE 602 via RAN 620 and UE 602 responsively indicates its identity to AMF 631 via RAN 620. AMF 631 interacts with other network functions to authenticate and authorize UE 602.

Responsive to the authentication and authorization, AMF 631 retrieves UE context for UE 602 to establish the PDU session. AMF 631 selects SMF 632 to establish the PDU session for UE 602 based on the UE context. SMF 632 selects one of UPFs 633 to establish the PDU session for UE 602. Typically, SMF 632 selects one of UPFs 633 based on the Tracking Area Identity (TAI) of RAN 620 and the requested service type. Since RANs 610 and 620 comprise different TAIs, SMF 632 may select different ones of UPFs 633 to serve UEs 601 and 602. SMF 632 transfers session context for the PDU session to AMF 631. AMF 631 transfers the session context to UE 602 over RAN 620. UE 602 begins the PDU session based on the session context. UE 602 wirelessly exchanges user data with CU 623 over RU 621 and DU 622. CU 623 exchanges the user data with the selected one of UPFs 633. The selected one of UPFs 633 exchanges the user data with data network 651.

CU 623, AMF 631, SMF 632, and UPFs 633 generate service metrics that characterize the PDU session to UE 602. The service metrics may include radio band, sector loading, average bit rate, reported RSRP, PDU session type, received QoS, UE location, and the like. CU 623 reports its service metrics to AMF 631. The serving one of UPFs 633 reports its service metrics to SMF 632. AMF 631 and SMF 632 generate service reports that include the service metrics. AMF 631 and SMF 632 interface with DCCF 634 and MFAF 635 to transfer service reports for delivery to NWDAF 636.

NWDAF 636 extracts the service metrics characterizing the wireless service delivery to UE 602. NWDAF 636 correlates the geographic location of UE 602 to region B. NWDAF 636 calculates spectral efficiency for the radio band used by UE 602 based on the RSRP measured by UE 602. NWDAF 636 calculates a spectral efficiency ratio for the radio band based on the serving sector loading of RAN 620. NWDAF 636 determines the bandwidth for the radio band used by UE 602. NWDAF 636 executes an algorithm that takes bandwidth, spectral efficiency, and spectral efficiency ratio as inputs and outputs a downlink speed estimation for UE 602 in Mbps. NWDAF 636 applies a downlink speed threshold to the speed estimation for UE 602. NWDAF 636 accesses ADRF 637 to retrieve a downlink speed profile for the radio band used by UE 602 and region B. This downlink speed profile indicates the percentage of population within region B that received downlink speeds that met or exceeded the downlink speed threshold on the radio band. NWDAF 636 updates the profile with the sufficiency or insufficiency speed marking for UE 602. NWDAF 636 stores this updated speed profile in ADRF 637.

A network operator initiates a user interface request in operator portal 641 to view downlink speed statistics for regions A and B. NWDAF 636 receives the request and retrieves the downlink speed profiles for region A and B. The data in the downlink speed profiles for region A and region B is used to render user interfaces in operator portal 641. NWDAF 636 forwards the downlink speed profiles to operator portal 641. A user interface system in operator portal 641 renders the requested user interface depicting geographic regions A and B and the downlink speed statistics for regions A and B. For example, the network operator may view the user interface and determine a sufficient percentage of the population within region A received downlink speeds that exceed the speed threshold while an insufficient percentage of the population within region B received downlink speeds that did not exceed the speed threshold. Advantageously, network operators may utilize the speed estimation information to identify geographic regions to build out network capacity to meet service targets.

Figure 7:
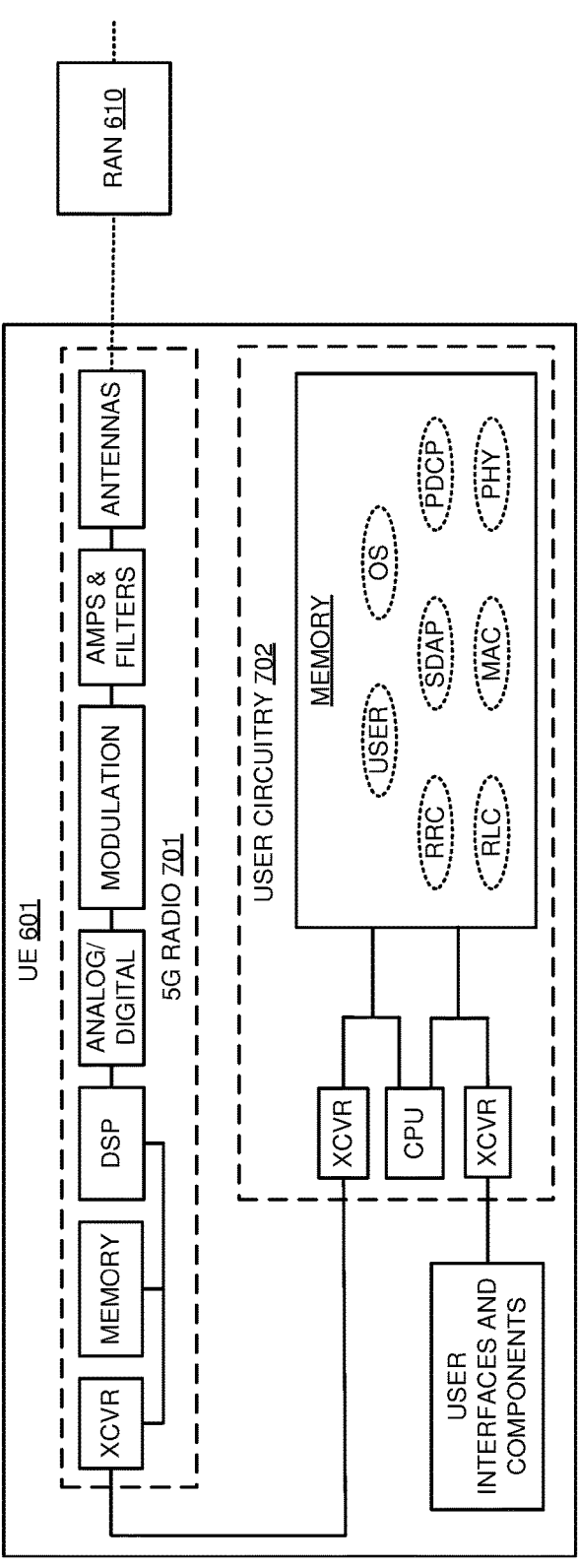
FIG. 7 illustrates a 5G User Equipment (UE) in the 5G communication network.

FIG. 7 illustrates 5G UE 601 in 5G communication network 600. UE 601 comprises an example of UEs 101-113, 121-123, 131-133, 311, and 321 illustrated in FIGS. 1 and 3, however UEs 101-113, 121-123, 131-133, 311, and 321 may differ. 5G UE 602 comprises a similar structure to 5G UE 601.

UE 601 comprises 5G radio 701 and user circuitry 702. Radio 701 comprises antennas, amplifiers, filters, modulation, analog-to-digital interfaces, Digital Signal Processors (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 701 is wirelessly coupled to 5G RAN 610 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving. Forward Error Correction (FEC) encoding/decoding, channel coding/decoding, channel estimation/equalization, and rate matching/de-matching, scrambling/ descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 8:
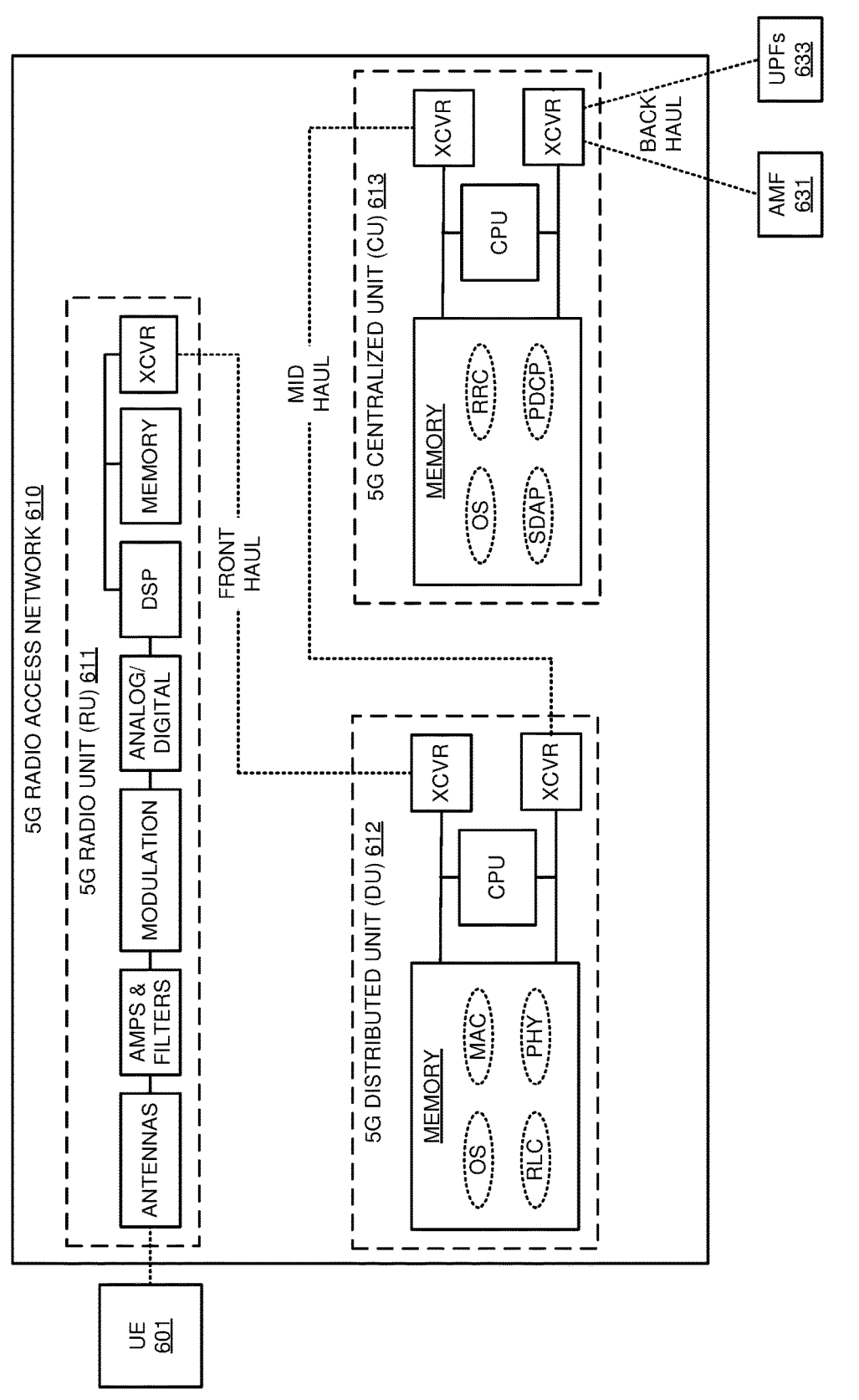
FIG. 8 illustrates a 5G Radio Access Network (RAN) in the 5G communication network.

FIG. 8 illustrates 5G RU 611, 5G DU 612, and 5G CU 613 in 5G communication network 600. RU 611, DU 612, and CU 613 comprise an example of RANs 114, 124, 134, 312, and 322 illustrated in FIGS. 1 and 3, however RANs 114, 124, 134, 312, and 322 may differ. 5G RU 621, 5G DU 622, and 5G CU 623 in RAN 620 comprise a similar structure to 5G RU 611, 5G DU 612, and 5G CU 613 in RAN 610.

RU 611 comprises antennas, amplifiers, filters, modulation, analog-to-digital interfaces, DSP, memory, and transceivers (XCVRs) that are coupled over bus circuitry. UE 601 is wirelessly coupled to the antennas in RU 611 over 5GNR links. Transceivers in 5G RU 611 are coupled to transceivers in 5G DU 612 over fronthaul links like enhanced Common Public Radio Interface (eCPRI). The DSPs in RU 611 executes their operating systems and radio applications to exchange 5GNR signals with UE 601 and to exchange 5GNR data with DU 612.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 612 over the transceivers.

For the downlink, the DSPs receive downlink 5GNR symbols from DU 612. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 612 comprises memory, CPU, and transceivers that are coupled over bus circuitry. The memory in 5G DU 612 stores operating systems and 5GNR network applications like PHY, MAC, and RLC. CU 613 comprises memory, CPU, and transceivers that are coupled over bus circuitry. The memory in CU 613 stores an operating system and 5GNR network applications like PDCP, SDAP, and RRC. Transceivers in 5G DU 612 are coupled to transceivers in RU 611 over front-haul links. Transceivers in DU 612 are coupled to transceivers in CU 613 over mid-haul links. A transceiver in CU 613 is coupled to network core 630 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/dc-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 9:
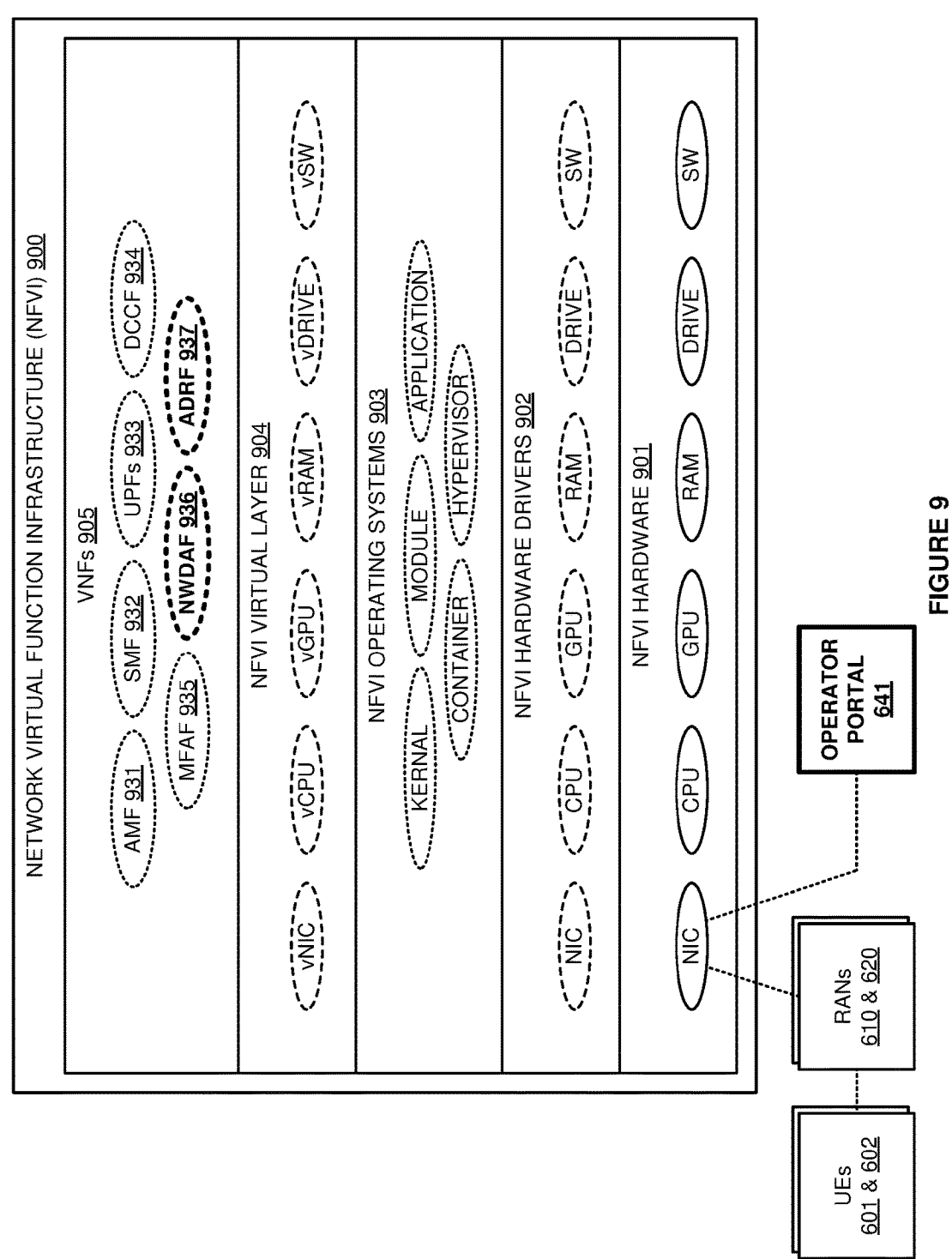
FIG. 9 illustrates a Network Function Virtualization Infrastructure (NFVI) in the 5G communication network.

FIG. 9 illustrates Network Function Virtualization Infrastructure (NFVI) 900. NFVI 900 comprises an example of core network 141 illustrated in FIG. 1 and control plane 331, user planes 332-333, and network analytics service 334 illustrated in FIG. 3, although core network 141, control plane 331, user planes 332-333, and network analytics service 334 may differ. NFVI 900 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, GPU, RAM, Flash/Disk Drives (DRIVE), and Data Switches (SW). NFVI hardware drivers 902 comprise software that is resident in the NIC, CPU, GPU, RAM, DRIVE, and SW. NFVI operating systems 903 comprise kernels, modules, applications, containers, hypervisors, and the like. NFVI virtual layer 904 comprises vNIC, vCPU, vGPU, vRAM, vDRIVE, and vSW. NFVI VNFs 905 comprise AMF 931, SMF 932, UPFs 933, DCCF 934, MFAF 935, NWDAF 936, and ADRF 937. Additional VNFs and network elements like AUSF, NSSF, and UDM are typically present but are omitted for clarity. NFVI 900 may be located at a single site or be distributed across multiple geographic locations. The NIC in NFVI hardware 901 is coupled to RAN 610, RAN 620, and operator portal 641. NFVI hardware 901 executes NFVI hardware drivers 902, NFVI operating systems 903, NFVI virtual layer 904, and NFVI VNFs 905 to form AMF 631, SMF 632, UPFs 633, DCCF 634, MFAF 635, NWDAF 636, NWDAF 637, and ADRF 637.

Figure 10:
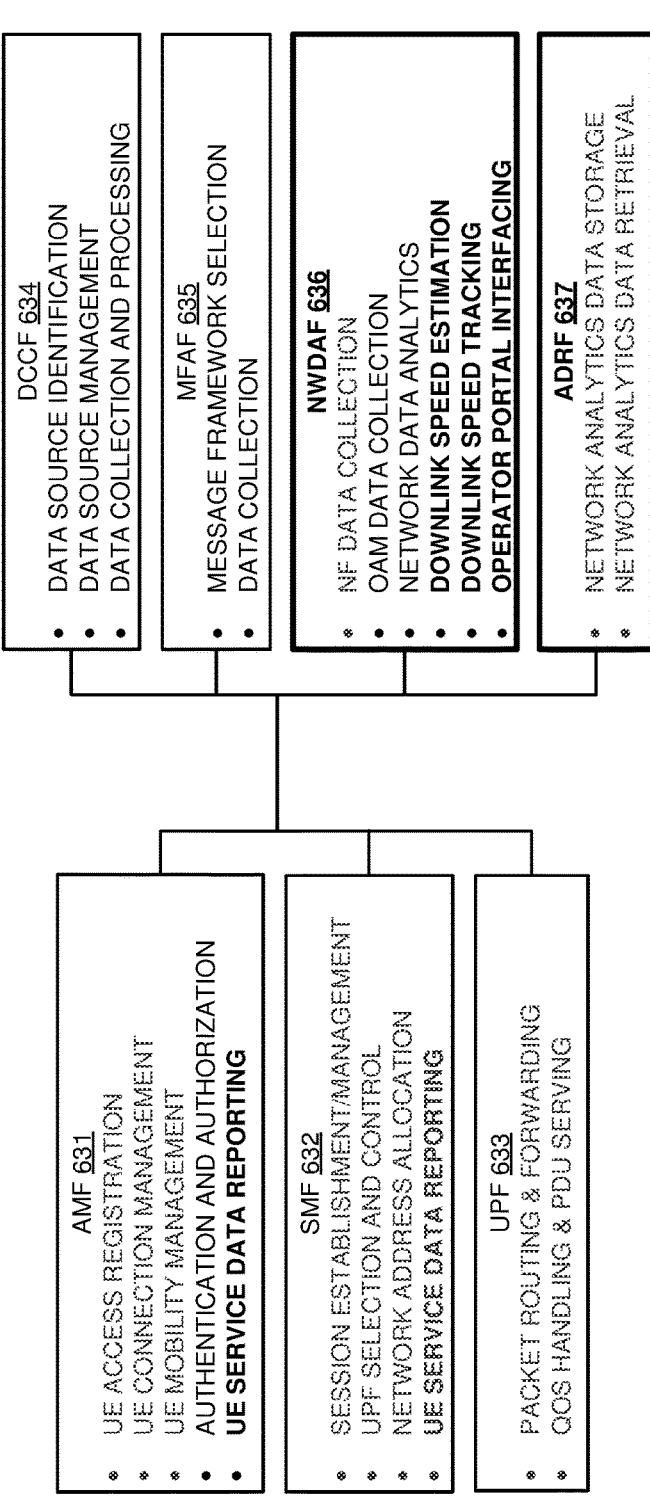
FIG. 10 further illustrates the NFVI in the 5G communication networks.

FIG. 10 further illustrates NFVI 900 in 5G communication network 600. AMF 631 performs UE access registration, UE connection management, UE mobility management, UE authentication and authorization, and UE service data reporting. SMF 632 performs session establishment and management, UPF selection and control, network address allocation, and UE service data reporting. UPFs 633 perform packet routing and forwarding and QoS handling and PDU serving. DCCF 634 performs data source identification, data source management, and data collection and processing. MFAF 635 performs message framework selection and data collection. NWDAF 636 performs network function (NF) data collection, orchestration and management (OAM) data collection, network data analytics, downlink speed estimation, downlink speed tracking, and operator portal interfacing. ADRF 637 performs network analytics data storage and network analytics data retrieval.

In operation, AMF 631 receives a registration request from RAN 610 for UE 601 in region A. The registration request comprises attachment data for UE 601 like registration type, UE capabilities, requested slice types, PDU session requests, measured RSRP, and UE location. AMF 631 responds to the registration request with an identity request for UE 601. AMF 631 receives an identify indication from UE 601 via RAN 610 and interacts with other network functions like NSSF, AUSF, and UDM to authenticate and authorize UE 601 for wireless data services. Responsive to the authentication and authorization, AMF 631 retrieves UE context for UE 601 to establish the requested PDU session. The UE context comprises QoS metrics, slice identifiers, network addresses, and the like. AMF 631 selects SMF 632 to establish the PDU session for UE 601 based on the UE context. SMF 632 selects one of UPFs 633 to establish the PDU session for UE 601 based on the TAI of RAN 610 and the requested service type for UE 601. SMF 632 transfers session context for the PDU session to AMF 631. AMF 631 transfers the session context to UE 601 over RAN 610. In region A, UE 601 begins the PDU session based on the session context. The selected one of UPFs 633 exchanges user data with UE 601 over RAN 610. The selected one of UPFs 633 exchanges the user data with data network 651.

AMF 631 receives another registration request from RAN 620 for UE 602 in region B. The registration request comprises attachment data for UE 602 like registration type, UE capabilities, requested slice types, PDU session requests, measured RSRP, and UE location. AMF 631 responds to the registration request with an identity request for UE 602. AMF 631 receives an identify indication from UE 602 via RAN 620 and interacts with other network functions to authenticate and authorize UE 602 for wireless data services. Responsive to the authentication and authorization, AMF 631 retrieves UE context for UE 602 to establish the requested PDU session. AMF 631 selects SMF 632 to establish the PDU session for UE 602 based on the UE context. SMF 632 selects one of UPFs 633 to establish the PDU session for UE 602 based on the TAI of RAN 620 and the requested service type for UE 602. SMF 632 transfers session context for the PDU session to AMF 631. AMF 631 transfers the session context to UE 602 over RAN 620. In region B, UE 602 begins the PDU session based on the session context. The selected one of UPFs 633 exchanges user data with UE 602 over RAN 620. The selected one of UPFs 633 exchanges the user data with data network 651. In some examples, the same one of UPFs 633 may serve both UE 601 and 602.

RAN 610, RAN 620, AMF 631, SMF 632, and UPFs 633 generate service metrics that characterize the wireless service delivery to UEs 601 and 602. The service metrics may include radio bands (e.g., 5GNR, EN-DC, LET, etc.), sector loading (e.g., number of RRC connected UEs for RANs 610 and 620), average bit rate (average backhaul Mbps), reported RSRP, PDU session type, received QoS, UE location (e.g., UE GPS coordinates), and the like. RAN 610 and RAN 620 report their service metrics to AMF 631. The serving one(s) of UPFs 633 reports its service metrics to SMF 632. AMF 631 and SMF 632 generate service reports that include the service metrics for UEs 601 and 602. AMF 631 and SMF 632 interface with DCCF 634 and MFAF 635 to transfer service reports for delivery to NWDAF 636 based on a data reporting subscription for NWDAF 636. MFAF 635 may select a messaging framework for AMF 631 and SMF 632 to use when generating service reports. DCCF 634 transfers service data requests to AMF 631 and SMF 632 for the service reports that specify the messaging framework to use. AMF 631 and SMF 632 transfer their service reports for delivery to NWDAF 636 using the selected messaging framework via DCCF 634 and MFAF 635. DCCF 634 formats the service reports from AMF 631 and SMF 632 for ingestion by NWDAF 636. DCCF 634 forwards the service reports to NWDAF 636.

NWDAF 636 extracts service metrics characterizing the wireless service delivery to UEs 601 and 602 from the service reports. NWDAF 636 correlates the UE location information for UE 601 to region A. NWDAF 636 correlates the UE location information for UE 602 to region B. For example, the location information may comprise TAIs for UEs 601 and 602 and NWDAF 636 may determine the TAI for UE 601 falls within region A while the TAI for UE 602 falls within region B. NWDAF 636 calculates a spectral efficiency for the radio band used by UE 601 based on the RSRP measured by UE 601 and calculates a spectral efficiency for the radio band used by UE 602 based on the RSRP measured by UE 602. For example, UE 601 may use a 5GNR band and NWDAF 636 may implement a data structure that correlates signal strength, UE location, and serving RAN location to a spectral efficiency. NWDAF 636 calculates a spectral efficiency ratio for the radio band used by UE 601 based on the serving sector loading of RAN 610. Similarly, NWDAF 636 calculates a spectral efficiency ratio for the radio band used by UE 602 based on the serving sector loading of RAN 620. NWDAF 636 identifies the bandwidths for the radio bands used by UEs 601 and 602. NWDAF 636 executes an algorithm that takes bandwidth, spectral efficiency, and spectral efficiency ratio as inputs and outputs downlink speed estimations for UEs 601 and 602. The algorithm may include other input factors like market, region location, and regression coefficients. For example, NWDAF 636 may execute the following algorithm:

$$\log(DL_{Kbps}) = \tag{1}$$
$$A + (B_{RSRP} \times \log(-RSRP)) + (C_{BW} \times BW) + D_{Band} + E_{Market}$$

$$DL_{Mbps} = SE_{ratio} \times \frac{\log^{-1}(DL_{Kbps})}{1000} \tag{2}$$

where $DL_{Kbps}$ and $DL_{Mbps}$ are estimated downlink speeds in Kbps and Mbps, RSRP is measured or estimate downlink signal strength, BW is the downlink spectrum used by the serving cell, $SE_{ratio}$ is the spectral efficiency ratio for the band, and A, $B_{RSRP}$, $C_{BW}$, $D_{Band}$, and $E_{Market}$ are regression coefficients. NWDAF 636 may derive $SE_{ratio}$ from serving sector loading. It should be appreciated that downlink speed estimation equations (1) and (2) are exemplary and may vary in other examples. NWDAF 636 may estimate downlink speeds for UEs in regions A and B individually and then aggregate the speeds for regions A and B based on the device types and carrier aggregation capabilities.

NWDAF 636 compares the speed estimations for UEs 601 and 602 to a downlink speed threshold to determine if the estimated speeds met, exceeded, or fell below, the Mbps threshold. When the speed estimates fall below the speed threshold, NWDAF 636 marks the downlink speeds for UE 601 and 602 as insufficient. Likewise, when the speed estimates exceed or meet the speed threshold, NWDAF 636 marks the downlink speeds for UEs 601 and 602 as sufficient.

NWDAF 636 accesses ADRF 637 to retrieve a downlink speed profile for the radio band used by UE 601 and region A. The downlink speed profile indicates the percentage of population within region A that received downlink speeds that met or exceeded the downlink speed threshold on the radio band. NWDAF 636 updates the profile with the sufficiency or insufficiency speed marking for UE 601. NWDAF 636 stores the updated speed profile for the band and region A in ADRF 637. NWDAF 636 accesses ADRF 637 to retrieve a downlink speed profile for the radio band used by UE 602 and region B. The downlink speed profile indicates the percentage of population within region B that received downlink speeds that met or exceeded the downlink speed threshold on the radio band. NWDAF 636 updates the profile with the sufficiency or insufficiency speed marking for UE 602. NWDAF 636 stores the updated speed profile for the band and region B in ADRF 637. The data in the speed profiles stored by ADRF 637 is used to render user interfaces to display the stored information for review by network operators. NWDAF 636 receives a user interface request from operator portal 641 to view downlink speed statistics for regions A and B. NWDAF 636 retrieves the downlink speed profiles for region A and B from ADRF 637. NWDAF 636 forwards the downlink speed profiles to operator portal 641.

Figure 11:
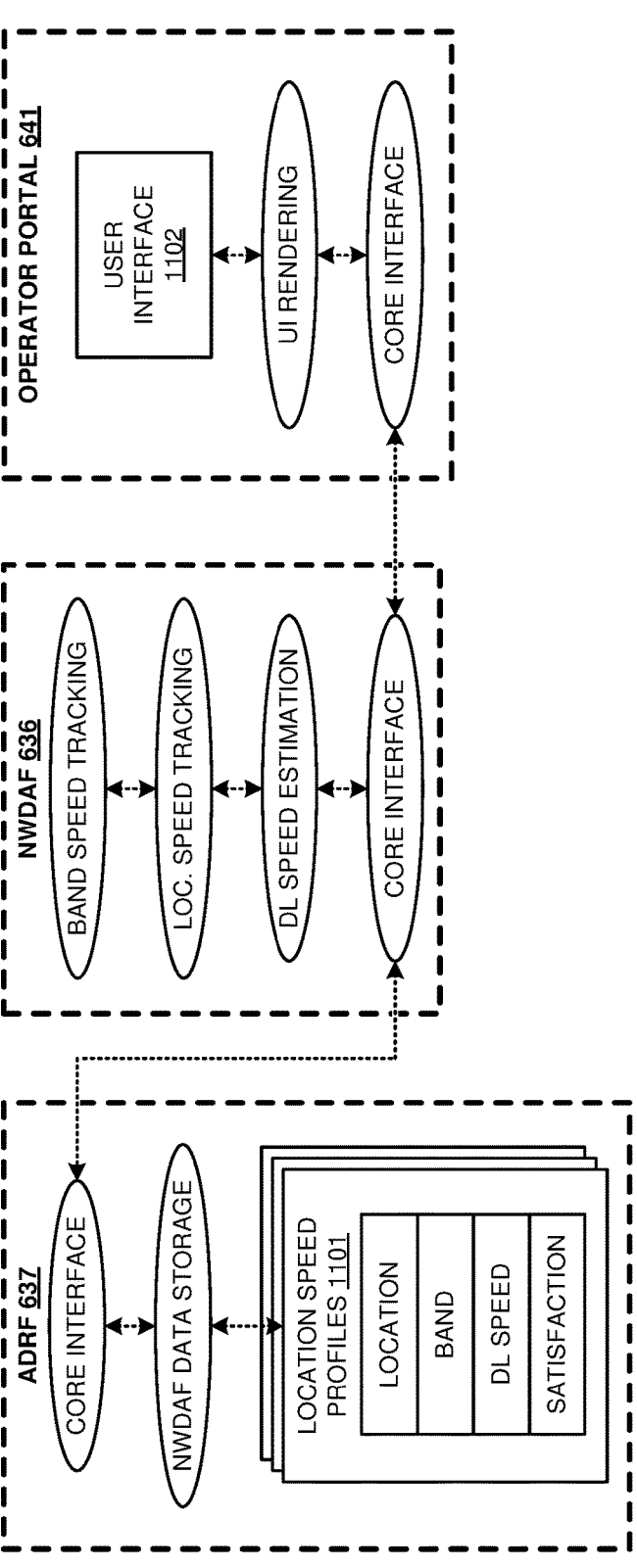
FIG. 11 illustrates data analysis and network operator systems in the 5G communication network.

FIG. 11 illustrates NWDAF 636, ADRF 637, and operator portal 641 in wireless communication network 600. NWDAF 636 comprises network applications for band speed tracking, location (LOC.) speed tracking, downlink (DL) speed estimation, and core interfacing. ADRF 637 comprises location profiles 1101 and network applications for NWDAF data storage and core interfacing. Operator portal 641 comprises user interface 1102 and network applications for user interface (UI) rendering and core interfacing. The core interface in ADRF 637 is communicatively coupled to the core interface in NWDAF 636. The core interface in NWDAF 636 is communicatively coupled to the core interface in ADRF 637 and the core interface in operator portal 641. The core interface in operator portal 641 is communicatively coupled to the core interface in NWDAF 636. In other examples, NWDAF 636, ADRF 637, and operator portal 641 may comprise different or additional components than those illustrated in FIG. 11.

In operation, the downlink speed estimation application in NWDAF 636 estimates downlink speed for a UE (e.g., UE 601). The location speed tracking application correlates the estimated downlink speed to a location for the UE (e.g., region A). The band speed tracking application correlates the estimated downlink speed to a radio band (e.g., 5GNR) used by the UE. The core interface in NWDAF 636 transfers signaling to retrieve one of location profiles 1101 based on the correlated location and band. The core interface in ADRF 637 receives the signaling and notifies the NWDAF data storage application. The NWDAF data storage application accesses location speed profiles 1101 and retrieves the requested profile. Location speed profiles 1101 comprise aggregate downlink speed and satisfaction statistics in association with locations and radio bands. The satisfaction statistics indicate whether or not the downlink speeds for the location and band met a target speed and coverage. The core interface in ADRF 637 transfers the requested profile to the core interface in NWDAF 637.

The downlink speed estimation application in NWDAF 637 updates the downlink speed in the retrieved profile with the newly estimated downlink speed for the UE. In some examples, the downlink speed estimation application may maintain a cumulative sum for all speed estimates for the location and band. The downlink speed estimation application may add the new estimate to the cumulative sum and divide the sum by the total number of estimates to determine an average estimated downlink speed for the region and the band. In some examples, the downlink speed estimation application may track the proportion of downlink speed estimates for the location and band that met or exceeded a downlink speed threshold. The downlink speed estimation application may update the proportion using the newly estimated speed. When the newly estimated downlink speed alters the downlink speed satisfaction rating for the band and location, the downlink speed estimation application alters the satisfaction rating in the profile. For example, if the newly estimated downlink speed causes the overall speed statistics for the band and location to exceed the target speed and/or coverage, the downlink speed estimation application changes the satisfaction rating from insufficient to sufficient. Likewise, if the newly estimated downlink speed causes the overall speed statistics for the band and location to fall below the target speed and/or coverage, the downlink speed estimation application changes the satisfaction rating from sufficient to insufficient. Once the location speed profile is updated, the core interface in NWDAF 637 returns the updated location speed profile to the core interface in ADRF 637. The NWDAF data storage application stores the updated location speed profile.

User interface 1102 in operator portal 641 receives a user input requesting to view downlink speed data for one or more locations and bands. User interface 1102 may comprise touchscreens, displays, keyboards, and the like to facilitate network operator interaction with NWDAF 636. The user interface rendering application in operator portal 641 generates a request for the downlink speed data requested by the network operator. The core interface in operator portal 641 forwards the request to the core interface in NWDAF 636. The core interface in NWDAF 636 in turn forwards the request to the core interface in ADRF 637. The NWDAF data storage application processes the request and retrieves corresponding ones of location speed profiles 1101. The core interface in ADRF 637 transfers the retrieved profiles to the core interface in NWDAF 636. The core interface in NWDAF 636 transfers the retrieved profiles to the core interface in operator portal 641. The user interface rendering application generates a display using the data in the retrieved location speed profiles. User interface 1102 renders the display for view by the network operator.

Figure 12:
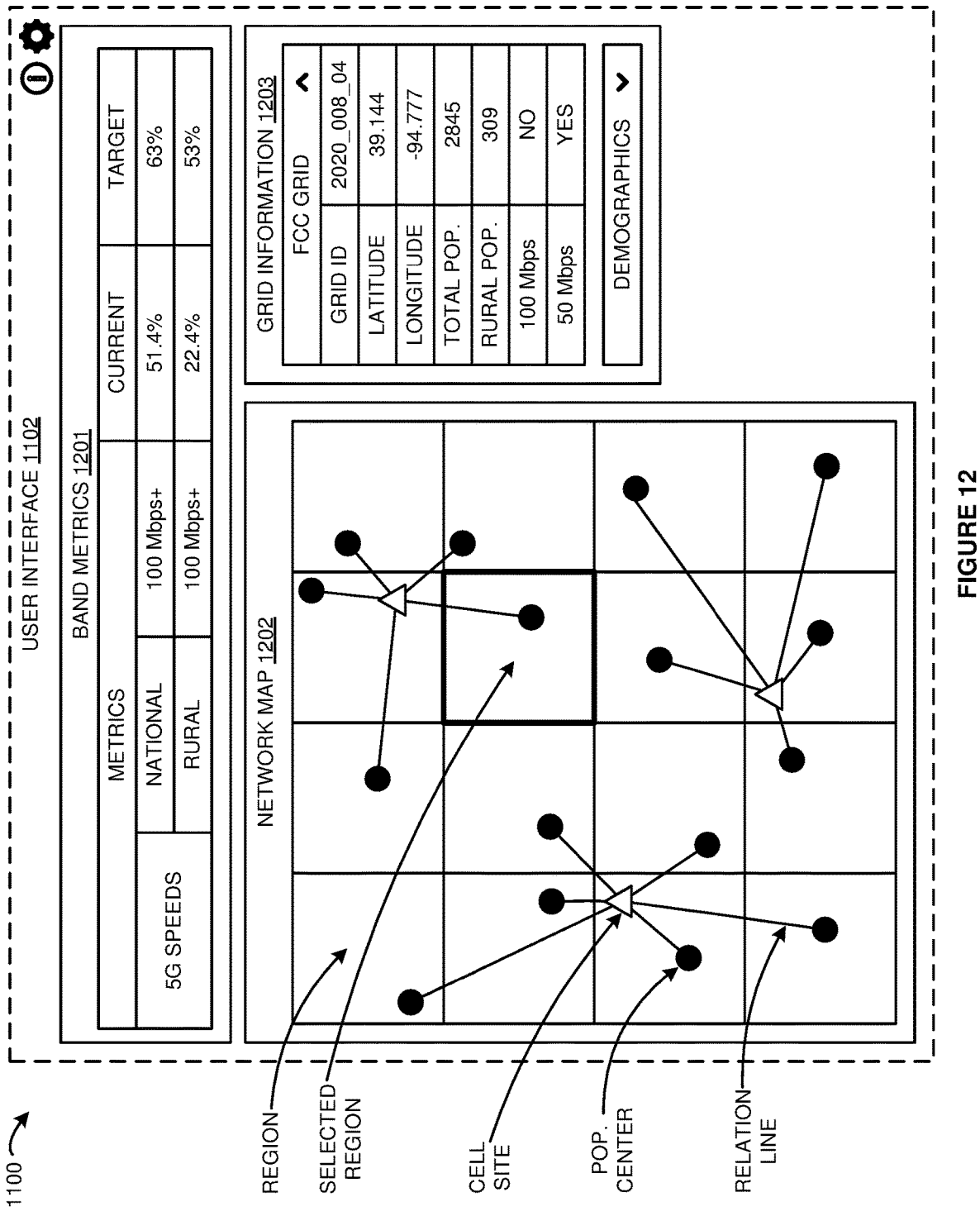
FIG. 12 illustrates a user interface in the 5G communication network.

FIG. 12 illustrates user interface 1102. User interface 1102 comprises an exemplary display that may be rendered using downlink speed estimate data generated by NWDAF 636. User interface 1102 comprises band metrics 1201, network map 1202, and grid information 1203. User interface 1102 may differ in other examples.

Band metrics 1201 comprises a panel that displays information relating to a selected radio band. In this example, band metrics 1201 comprise information relating to a 5G radio band, however band metrics 1201 may display metrics for other radio bands like LTE radio bands. Band metrics 1201 indicates a target downlink speed, a current total coverage, current rural coverage, target total coverage, and target rural coverage. The current coverage values indicate the percentage of the total population and the rural population that currently receive the target downlink speed. The target coverage values indicate the targeted percentage of the total and rural population that received the target downlink speed. In this example, the target downlink speed comprises 100 Mbps, the current national coverage comprises 51.4%, the current rural coverage comprises 22.4%, and target national coverage comprises 63%, and the target rural coverage comprises 53%. It should be appreciated that these numbers are exemplary and may differ in other examples.

Network map 1202 comprises a panel that displays a geographic view of wireless communication network 600 in relation to population. The geographic view is divided into grids. Each grid comprises a geographic region. For example, one of the grid squares may comprise region A illustrated in FIG. 6 while another one the grid squares may comprise region B illustrated in FIG. 6. Network map 1202 displays the center of population in each geographic region. The population center may comprise a mathematical population centroid for each region, a census area with the highest population within the grid square, and/or another type of designation to indicate a population concentration. Network map 1202 displays dominate cell sites that serve the population centers as well as relation lines that indicate which cell sites serve which population centers. For example, one of the cell sites may comprise RAN 610 illustrated in FIG. 6 while another one of the cell sites may comprise RAN 620 illustrated in FIG. 6. As illustrated in FIG. 11, the geographic regions are depicted as grid squares, the population centers are depicted as circles, the cell sites are depicted as triangles, and the relation lines designate dominate cell sites for each of the population centers, however other types of visualizations may be used to form network map 1202.

Grid information 1203 displays downlink speed and location statistics for the band for a selected map region. In this example, the selected map region is shown in bold. For example, user interface 1102 may render grid information 1203 in response to a user selection of one of the grid squares in network map 1202. Grid information 1203 comprises selectable drop-down menus labeled FCC grid and demographics. In this example, the FCC grid menu is selected. Grid information 1203 indicates the grid ID for the selected map region, GPS coordinates for the selected map region, the total region population, the total rural population of the region, and downlink speed satisfaction indications. In this example, grid information 1203 indicates the target coverage at 100 Mbps for the selected region is not met (e.g., insufficient) while the target coverage at 50 Mbps for the selected region is met (e.g., sufficient). The data depicted in grid information 1203 is exemplary and may differ in other examples.

Figure 13:
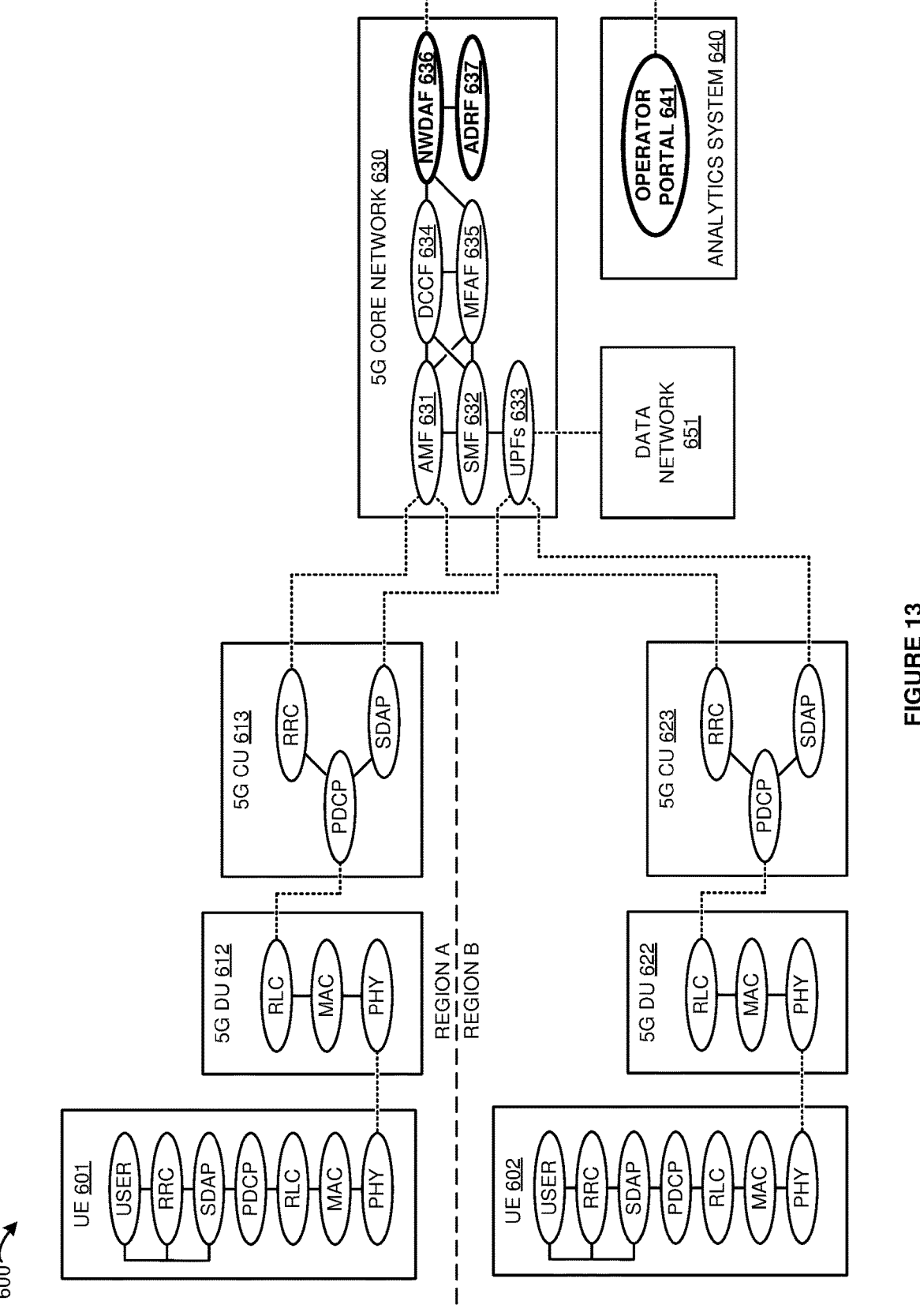
FIG. 13 illustrates an exemplary operation of the 5G communication network to estimate downlink speed.

FIG. 13 illustrates an exemplary operation of 5G communication network 600 to estimate downlink speeds for wireless user devices. The operation may vary in other examples. In region A. UE 601 wirelessly attaches to CU 613 via DU 612 and RU 611 in response to the execution of a user application. The RRC in UE 601 exchanges attachment signaling comprising registration type, UE capabilities, requested slice types, data session requests, and UE location with the RRC in CU 613 over the PDCPs, RLCs, MACs, and PHYs. The RRC in CU 613 transfers a registration request for UE 601 to AMF 631. AMF 631 interacts with other network functions to authenticate and authorize UE 601 for wireless data services. Responsive to the authentication and authorization, AMF 631 retrieves UE context for UE 601 to establish a data session. AMF 631 selects SMF 632 to establish the data session for UE 601 based on the UE context. SMF 632 selects one of UPFs 633 to establish the data session for UE 601. SMF 632 transfers session context for the data session to AMF 631. AMF 631 transfers the session context to the RRC in CU 613. The RRC in CU 613 transfers the session context to the RRC in UE 601 over the PDCPs, RLCs, MACs, and PHYs. The RRC in UE 601 controls the SDAP in UE 601 to begin the data session using the session context. The SDAP in UE 601 wirelessly exchanges user data with the SDAP in CU 613 over the PDCPs, RLCs, MACs, and PHYs. The SDAP in CU 613 exchanges the user data with the selected one of UPFs 633. The selected one of UPFs 633 exchanges the user data with data network 651.

In region B, UE 602 wirelessly attaches to CU 623 via DU 622 and RU 621 in response to the execution of a user application. The RRC in UE 602 exchanges attachment signaling comprising registration type, UE capabilities, requested slice types, data session requests, and UE location with the RRC in CU 623 over the PDCPs, RLCs, MACs, and PHYS. The RRC in CU 623 transfers a registration request for UE 602 to AMF 631. AMF 631 interacts with other network functions to authenticate and authorize UE 602 for wireless data services. Responsive to the authentication and authorization, AMF 631 retrieves UE context for UE 602 to establish a data session. AMF 631 selects SMF 632 to establish the data session for UE 602 based on the UE context. SMF 632 selects another one of UPFs 633 to establish the data session for UE 602. SMF 632 transfers session context for the data session to AMF 631. AMF 631 transfers the session context to the RRC in CU 623. The RRC in CU 623 transfers the session context to the RRC in UE 602 over the PDCPs, RLCs, MACs, and PHYs. The RRC in UE 602 controls the SDAP in UE 602 to begin the data session using the session context. The SDAP in UE 602 wirelessly exchanges user data with the SDAP in CU 613 over the PDCPs, RLCs, MACs, and PHYs. The SDAP in CU 613 exchanges the user data with the selected one of UPFs 633. The selected one of UPFs 633 exchanges the user data with data network 651.

The RRC and SDAP in CU 613, AMF 631, SMF 632, and the selected one of UPFs 633 generate service metrics that characterize the data session to UE 601. Similarly, the RRC and SDAP in CU 623, AMF 631, SMF 632, and the selected one of UPFs 633 generate service metrics that characterize the data session to UE 602. The RRCs and SDAPs in CUs 613 and 623 report their service metrics to AMF 631 and SMF 632. The serving ones of UPFs 633 report their service metrics to SMF 632. The service metrics are tagged with UE IDs for UE 601 and 602 and include the locations reported by UEs 601 and 602.

MFAF 635 selects a messaging framework for AMF 631 and SMF 632 to use when generating service reports. DCCF 634 transfers service data requests to AMF 631 and SMF 632 for the service reports that specify the messaging framework to use. AMF 631 and SMF 632 transfer their service reports characterizing the wireless service delivery to UEs 601 and 602 to DCCF 634 using the selected messaging framework. DCCF 634 formats the service reports from AMF 631 and SMF 632 for ingestion by NWDAF 636. DCCF 634 forwards the service reports to NWDAF 636.

NWDAF 636 extracts service metrics characterizing the wireless service delivery to UEs 601 and 602 from the service reports. NWDAF 636 correlates the UE location information for UE 601 to region A. NWDAF 636 correlates the UE location information for UE 602 to region B. Since RSRP measurements were not included in the service reports, NWDAF 636 estimates RSRP values for UEs 601 and 602. For example, NWDAF 636 may estimate RSRP for UEs 601 and 602 based on the radio band, UE device type, RAN antenna type, UE proximity to RAN, and/or other metrics associated with RSRP. NWDAF 636 calculates a spectral efficiency for the radio band used by UE 601 based on the estimated RSRP for UE 601 and calculates a spectral efficiency for the radio band used by UE 602 based on the estimated RSRP for UE 602. NWDAF 636 calculates a spectral efficiency ratio for the radio band used by UE 601 based on the serving sector loading of RAN 610. Similarly, NWDAF 636 calculates a spectral efficiency ratio for the radio band used by UE 602 based on the serving sector loading of RAN 620. NWDAF 636 identifies the bandwidths for the radio bands used by UEs 601 and 602. NWDAF 636 executes an algorithm that takes bandwidth, spectral efficiency, and spectral efficiency ratio as inputs and outputs downlink speed estimations for UEs 601 and 602.

NWDAF 636 compares the speed estimations for UEs 601 and 602 to a downlink speed threshold to determine if the estimated speeds met, exceeded, or fell below, the threshold. NWDAF 636 accesses ADRF 637 to retrieve a downlink speed profile for the radio band used by UE 601 and region A. NWDAF 636 updates the profile with the sufficiency or insufficiency speed marking for UE 601. NWDAF 636 stores the updated speed profile for the band and region A in ADRF 637. NWDAF 636 accesses ADRF 637 to retrieve another downlink speed profile for the radio band used by UE 602 and region B. NWDAF 636 updates the profile with the sufficiency or insufficiency speed marking for UE 602. NWDAF 636 stores the updated speed profile for the band and region B in ADRF 637. In response to a network operator request, operator portal 641 transfers a data request to render a user interface depicting downlink speed statistics for region A and region B. In response to the request, NWDAF 636 retrieves the downlink speed profiles for region A and B from ADRF 637. NWDAF 636 forwards the downlink speed profiles to operator portal 641. A user interface system in operator portal 641 renders the requested user interface based on the data received from NWDAF 636.

The wireless data network circuitry described above comprises computer hardware and software that form special-purpose network circuitry to estimate downlink speeds for wireless user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to estimate downlink speeds for wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless communication network to estimate wireless downlink speed, the method comprising:

serving, by a network control plane, a user device using a radio band of an access node that resides at a geographic location and generating service metrics that indicate received signal strength associated with the geographic location and the radio band based on the service;

subscribing, by the analytics system, to the network control plane to receive a measurement report from the network control plane that indicates the received signal strength associated with the geographic location and the radio band;

receiving, by the analytics system in the wireless communication network, the measurement report indicating the received signal strength associated with the geographic location and the radio band based on the subscription;

converting, by the analytics system, the received signal strength for the radio band to a spectral efficiency for the radio band;

determining, by the analytics system, a bandwidth for the radio band;

hosting, by the analytics system, a data structure that correlates the radio band loading for the geographic location into a spectral efficiency ratio, inputting the loading for the radio band and the geographic location into the data structure, and obtaining the spectral efficiency ratio for the radio band as an output from the data structure;

estimating, by the analytics system, a downlink speed estimate for the geographic location and the radio band based on the spectral efficiency ratio, the spectral efficiency, and the bandwidth;

applying, by the analytics system, a speed threshold to the downlink speed estimate;

when the downlink speed estimate does not exceed the speed threshold, marking, by the analytics system, the geographic location and the radio band as insufficient; and generating, by the analytics system, data for rendering a user interface to display a view of the geographic area, the downlink speed estimate for the geographic location and the radio band, and the insufficiency marking for the geographic location and the radio band.

2. The method of claim 1 wherein the speed threshold corresponds to a government regulation.

3. The method of claim 1 wherein:

the received signal strength comprises a Received Signal Received Power (RSRP) estimation; and receiving the measurement report comprises generating a coverage prediction that comprises the RSRP estimation.

4. The method of claim 1 wherein:

the received signal strength comprises a Received Signal Received Power (RSRP) measurement; and receiving the measurement report comprises receiving the measurement report generated by a wireless User Equipment (UE) that comprises the RSRP measurement.

5. The method of claim 1 wherein the geographic location comprises a population concentration within the geographic location.

6. The method of claim 1 wherein the radio band loading comprises serving sector loading.

7. The method of claim 1 further comprising:

receiving, by the analytics system, an additional measurement report from the network control plane indicating subsequent received signal strength associated with the geographic location and the radio band based on the subscription;

converting, by the analytics system, the subsequent received signal strength for the radio band to a subsequent spectral efficiency for the radio band;

estimating, by the analytics system, a subsequent downlink speed estimate for the geographic location and the radio band based on the spectral efficiency ratio, the subsequent spectral efficiency, and the bandwidth; and applying, by the analytics system, the speed threshold to the subsequent downlink speed estimate;

when the subsequent downlink speed estimate exceeds the speed threshold, marking, by the analytics system, the geographic location and the radio band as sufficient; and updating, by the analytics system, the data for rendering the user interface to display an updated view of the geographic location, the subsequent downlink speed estimate for the geographic location and the radio band, and the sufficiency marking.

8. A wireless communication network configured to estimate wireless downlink speed, the wireless communication network comprising:

network control plane circuitry configured to serve a user device using a radio band of an access node that resides at a geographic location and generate service metrics that indicate received signal strength associated with the geographic location and the radio band based on the service;

data analysis circuitry configured to:

subscribe to the network control plane to receive a measurement report from the network control plane that indicates the received signal strength associated with the geographic location and the radio band;

receive the measurement report indicating the received signal strength associated with the geographic location and the radio band;

convert the received signal strength for the radio band to a spectral efficiency for the radio band;

determine a bandwidth for the radio band;

host a data structure that correlates the radio band loading for the geographic location into a spectral efficiency ratio, input the loading for the radio band and the geographic location into the data structure, and obtain the spectral efficiency ratio for the radio band as an output from the data structure;

estimate a downlink speed estimate for the geographic location and the radio band based on the spectral efficiency ratio, the spectral efficiency, and the bandwidth;

apply a speed threshold to the downlink speed estimate;

when the downlink speed estimate does not exceed the speed threshold, mark the geographic location and the radio band as insufficient; and generate data for rendering a user interface to display a view of the geographic area, the downlink speed estimate for the geographic location and the radio band, and the insufficiency marking for the geographic location and the radio band.

9. The wireless communication network of claim 8 wherein the speed threshold corresponds to a government regulation.

10. The wireless communication network of claim 8 wherein:

the received signal strength comprises a Received Signal Received Power (RSRP) estimation; and the data analysis circuitry is further configured to generate a coverage prediction that comprises the RSRP estimation.

11. The wireless communication network of claim 8 wherein:

the received signal strength comprises a Received Signal Received Power (RSRP) measurement; and the data analysis circuitry is further configured to receive the measurement report generated by a wireless User Equipment (UE) that comprises the RSRP measurement.

12. The wireless communication network of claim 8 wherein the geographic location comprises a population concentration within the geographic location.

13. The wireless communication network of claim 8 wherein the radio band loading comprises serving sector loading.

14. The wireless communication network of claim 8 wherein:

the data analysis circuitry is further configured to:

receive an additional measurement report from the network control plane circuitry indicating subsequent received signal strength associated with the geographic location and the radio band based on the subscription;

convert the subsequent received signal strength for the radio band to a subsequent spectral efficiency for the radio band;

estimate a subsequent downlink speed estimate for the geographic location and the radio band based on the spectral efficiency ratio, the subsequent spectral efficiency, and the bandwidth; and apply the speed threshold to the subsequent downlink speed estimate;

when the subsequent downlink speed estimate exceeds the speed threshold, mark the geographic location and the radio band as sufficient; and update the data for rendering the user interface to display an updated view of the geographic location, the subsequent downlink speed estimate for the geographic location and the radio band, and the sufficiency marking; and further comprising:

user interface circuitry configured to:

utilize the data to render the user interface that displays the view of the geographic location, the downlink speed estimate for the geographic location and the radio band, and the insufficiency marking; and utilize the updated data to render an updated user interface to display the updated view of the geographic location, the subsequent downlink speed estimate for the geographic location and the radio band, and the sufficiency marking.

15. A method of operating a wireless communication network to estimate wireless downlink speed, the method comprising:

subscribing to a network control plane to receive a measurement report from the network control plane that indicates a received signal strength associated with the geographic location and the radio band, wherein the network control plane serves a user device using the radio band of an access node that resides at the geographic location and generates service metrics that indicate the received signal strength associated with the geographic location and the radio band based on the service;

receiving the measurement report from the network control plane indicating received signal strength associated with a geographic location and a radio band based on the subscription;

converting the received signal strength for the radio band to a spectral efficiency for the radio band;

determining a bandwidth for the radio band;

hosting a data structure that correlates the radio band loading for the geographic location into a spectral efficiency ratio, inputting the loading for the radio band and the geographic location into the data structure, and obtaining the spectral efficiency ratio for the radio band as an output from the data structure;

estimating a downlink speed estimate for the geographic location and the radio band based on the spectral efficiency ratio, the spectral efficiency, and the bandwidth;

applying a speed threshold to the downlink speed estimate;

when the downlink speed estimate does not exceed the speed threshold, marking the geographic location and the radio band as insufficient; and generating data for rendering a user interface to display a view of the geographic area, the downlink speed estimate for the geographic location and the radio band, and the insufficiency marking for the geographic location and the radio band.

16. The method of claim 15 further comprising:

receiving an additional measurement report from the network control plane indicating subsequent received signal strength associated with the geographic location and the radio band based on the subscription;

converting the subsequent received signal strength for the radio band to a subsequent spectral efficiency for the radio band;

estimating a subsequent downlink speed estimate for the geographic location and the radio band based on the spectral efficiency ratio, the subsequent spectral efficiency, and the bandwidth;

applying the speed threshold to the subsequent downlink speed estimate;

when the subsequent downlink speed estimate exceeds the speed threshold, marking the geographic location and the radio band as sufficient;

updating the data for rendering the user interface to display an updated view of the geographic location, the subsequent downlink speed estimate for the geographic location and the radio band, and the sufficiency marking for the geographic location and the radio band.

17. The method of claim 16 wherein:

the received signal strength comprises a Received Signal Received Power (RSRP) estimation;

the subsequent received signal strength comprises a subsequent RSRP estimation;

receiving the measurement report comprises generating a coverage prediction that comprises the RSRP estimation; and receiving the additional measurement report comprises generating a subsequent coverage prediction that comprises the subsequent RSRP estimation.

18. The method of claim 16 wherein:

the received signal strength comprises a Received Signal Received Power (RSRP) measurement;

the subsequent received signal strength comprises a subsequent RSRP measurement;

receiving the measurement report comprises receiving the measurement report generated by a wireless User Equipment (UE) that comprises the RSRP measurement; and receiving the additional measurement report comprises receiving the additional measurement report generated by the wireless UE that comprises the subsequent RSRP measurement.

19. The method of claim 16 wherein the geographic location comprises a population concentration within the geographic location.

20. The method of claim 15 wherein determining the radio band loading comprises serving sector loading.

* * * * *